United States Patent
Liu et al.

(10) Patent No.: US 12,518,148 B2
(45) Date of Patent: Jan. 6, 2026

(54) DATA PROCESSING METHOD, DEVICE, COMPUTER EQUIPMENT AND STORAGE MEDIUM

(71) Applicant: ANHUI CAMBRICON INFORMATION TECHNOLOGY CO., LTD., Anhui (CN)

(72) Inventors: Shaoli Liu, Anhui (CN); Di Huang, Anhui (CN); Xishan Zhang, Anhui (CN); Yao Zhang, Anhui (CN)

(73) Assignee: ANHUI CAMBRICON INFORMATION TECHNOLOGY CO., LTD., Anhui (CN)

( * ) Notice: Subject to any disclaimer, the term of this patent is extended or adjusted under 35 U.S.C. 154(b) by 1151 days.

(21) Appl. No.: 17/254,372

(22) PCT Filed: Aug. 20, 2020

(86) PCT No.: PCT/CN2020/110134
§ 371 (c)(1),
(2) Date: Dec. 21, 2020

(87) PCT Pub. No.: WO2021/036890
PCT Pub. Date: Mar. 4, 2021

(65) Prior Publication Data
US 2021/0374510 A1    Dec. 2, 2021

(30) Foreign Application Priority Data

Aug. 23, 2019 (CN) .................. 201910784982.0
Sep. 19, 2019 (CN) .................. 201910888599.X

(51) Int. Cl.
*G06N 3/04* (2023.01)
*G06N 3/063* (2023.01)
*G06N 3/08* (2023.01)

(52) U.S. Cl.
CPC ............ *G06N 3/063* (2013.01); *G06N 3/08* (2013.01)

(58) Field of Classification Search
CPC .......... G06N 3/063; G06N 3/08; G06N 3/084; G06N 3/0464; G06N 3/0495; G06N 3/09
See application file for complete search history.

(56) References Cited

U.S. PATENT DOCUMENTS

| | | | |
|---|---|---|---|
| 5,052,043 | A | 9/1991 | Gaborski |
| 6,704,757 | B1 | 3/2004 | Ohmi et al. |

(Continued)

FOREIGN PATENT DOCUMENTS

| | | |
|---|---|---|
| CN | 1503858 A | 6/2004 |
| CN | 1503958 A | 6/2004 |

(Continued)

OTHER PUBLICATIONS

Choukroun et al, Low-bit Quantization of Neural Networks for Efficient Inference; Dated Mar. 25, 2019; 10 pages.

(Continued)

*Primary Examiner* — Hassan Mrabi
(74) *Attorney, Agent, or Firm* — Rimon PC

(57) ABSTRACT

The present disclosure provides a data processing method, a board card device, computer equipment, and a storage medium for data quantization. The board card provided in the present disclosure includes a storage device, an interface apparatus, a control device, and an artificial intelligence chip of a data processing device, where the artificial intelligence chip is connected to the storage device, the control device, and the interface apparatus, respectively. The storage device is configured to store data; the interface apparatus is configured to implement data transmission between the artificial intelligence chip and an external apparatus; and the control device is configured to monitor the state of the artificial (Continued)

determining a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient — S11 quantizing each piece of data to be quantized according to a corresponding quantization parameter to obtain a piece of quantized data corresponding to each piece of data to be quantized — S12 obtaining a quantization result of the target data according to the piece of quantized data corresponding to each piece of data to be quantized, so that an operation may be performed in the layer to be quantized according to the quantization result of the target data — S13 intelligence chip. The data to be quantized is quantized according to corresponding quantization parameters, which reduce the storage space of data while ensuring precision, accuracy and reliability of the operation result, and improving the operation efficiency.

19 Claims, 4 Drawing Sheets

(56) References Cited

U.S. PATENT DOCUMENTS

| | | |
|---|---|---|
| 6,715,065 B1 | 3/2004 | Ebata et al. |
| 6,931,639 B1 | 8/2005 | Eickemeyer |
| 7,242,414 B1 | 7/2007 | Thekkath et al. |
| 7,406,451 B2 | 7/2008 | Mrziglod et al. |
| 7,721,128 B2 | 5/2010 | Johns et al. |
| 7,945,607 B2 | 5/2011 | Hinds |
| 8,694,572 B2 | 4/2014 | Samy et al. |
| 8,924,455 B1 | 12/2014 | Barman et al. |
| 9,412,366 B2 | 8/2016 | Wilensky et al. |
| 9,916,531 B1 | 3/2018 | Zivkovic et al. |
| 10,187,568 B1 | 1/2019 | Tran et al. |
| 10,224,954 B1 | 3/2019 | Madduri et al. |
| 10,360,304 B1 | 7/2019 | Alvarez et al. |
| 10,427,306 B1 | 10/2019 | Quinlan et al. |
| 2002/0138714 A1 | 9/2002 | Leibholz et al. |
| 2003/0167460 A1 | 9/2003 | Desai et al. |
| 2005/0138327 A1 | 6/2005 | Tabei |
| 2006/0161375 A1 | 7/2006 | Duberstein et al. |
| 2009/0113186 A1 | 4/2009 | Kato et al. |
| 2009/0125293 A1 | 5/2009 | Lefurgy et al. |
| 2010/0073068 A1 | 3/2010 | Cho et al. |
| 2011/0060587 A1 | 3/2011 | Phillips et al. |
| 2011/0301777 A1 | 12/2011 | Cox et al. |
| 2012/0316845 A1 | 12/2012 | Grey et al. |
| 2013/0054110 A1 | 2/2013 | Sata |
| 2013/0332610 A1 | 12/2013 | Beveridge |
| 2014/0081625 A1 | 3/2014 | Wilensky et al. |
| 2014/0164737 A1 | 6/2014 | Collange et al. |
| 2014/0249814 A1 | 9/2014 | Nakano et al. |
| 2015/0134581 A1 | 5/2015 | Doeding et al. |
| 2015/0370303 A1 | 12/2015 | Krishnaswamy et al. |
| 2016/0026231 A1 | 1/2016 | Ignowski et al. |
| 2016/0054922 A1 | 2/2016 | Awasthi et al. |
| 2016/0124710 A1 | 5/2016 | Lutz et al. |
| 2016/0170866 A1 | 6/2016 | Ioualalen et al. |
| 2016/0328645 A1 | 11/2016 | Lin et al. |
| 2016/0328647 A1 | 11/2016 | Lin et al. |
| 2017/0090956 A1 | 3/2017 | Linsky |
| 2017/0103022 A1 | 4/2017 | Kreinin et al. |
| 2017/0142327 A1 | 5/2017 | Bayani |
| 2017/0161604 A1 | 6/2017 | Craddock et al. |
| 2017/0221176 A1 | 8/2017 | Munteanu et al. |
| 2017/0257079 A1 | 9/2017 | Jain et al. |
| 2017/0262959 A1 | 9/2017 | Lee et al. |
| 2017/0316307 A1 | 11/2017 | Koster et al. |
| 2017/0316312 A1 | 11/2017 | Goyal et al. |
| 2017/0344882 A1 | 11/2017 | Ambrose et al. |
| 2017/0353163 A1 | 12/2017 | Gazneli et al. |
| 2017/0357530 A1 | 12/2017 | Shih et al. |
| 2017/0357910 A1 | 12/2017 | Sommer et al. |
| 2018/0046903 A1 | 2/2018 | Yao et al. |
| 2018/0088996 A1 | 3/2018 | Rossi et al. |
| 2018/0096243 A1 | 4/2018 | Patil et al. |
| 2018/0107925 A1 | 4/2018 | Choi et al. |
| 2018/0157464 A1 | 6/2018 | Lutz et al. |
| 2018/0288440 A1 | 10/2018 | Chao |
| 2018/0293517 A1 | 10/2018 | Browne et al. |
| 2018/0300931 A1 | 10/2018 | Vembu et al. |
| 2018/0322391 A1 | 11/2018 | Wu et al. |
| 2018/0357541 A1 | 12/2018 | Chen et al. |
| 2018/0367729 A1 | 12/2018 | Parasnis et al. |
| 2018/0373976 A1 | 12/2018 | Woo |
| 2019/0042925 A1 | 2/2019 | Choe et al. |
| 2019/0050710 A1 | 2/2019 | Wang et al. |
| 2019/0057696 A1 | 2/2019 | Ogawa |
| 2019/0114142 A1 | 4/2019 | Yoda et al. |
| 2019/0122094 A1 | 4/2019 | Chen et al. |
| 2019/0122119 A1 | 4/2019 | Husain |
| 2019/0138372 A1 | 5/2019 | Tee |
| 2019/0147322 A1 | 5/2019 | Kim et al. |
| 2019/0164285 A1 | 5/2019 | Nye et al. |
| 2019/0180170 A1 | 6/2019 | Huang et al. |
| 2019/0199370 A1 | 6/2019 | Madduri et al. |
| 2019/0220734 A1 | 7/2019 | Ferdman et al. |
| 2019/0228762 A1 | 7/2019 | Wang et al. |
| 2019/0251429 A1 | 8/2019 | Du et al. |
| 2019/0265949 A1 | 8/2019 | Ito |
| 2019/0278677 A1 | 9/2019 | Terechko et al. |
| 2019/0294968 A1 | 9/2019 | Vantrease et al. |
| 2019/0303765 A1 | 10/2019 | Gou et al. |
| 2019/0339937 A1 | 11/2019 | Lo et al. |
| 2020/0005424 A1 | 1/2020 | Appu et al. |
| 2020/0097799 A1 | 3/2020 | Divakar et al. |
| 2020/0117453 A1 | 4/2020 | Zhang et al. |
| 2020/0117614 A1 | 4/2020 | Zhang et al. |
| 2020/0125508 A1 | 4/2020 | Liu et al. |
| 2020/0126554 A1 | 4/2020 | Chen et al. |
| 2020/0126555 A1 | 4/2020 | Chen et al. |
| 2020/0142748 A1 | 5/2020 | Liu et al. |
| 2020/0159527 A1 | 5/2020 | Zhang et al. |
| 2020/0159530 A1 | 5/2020 | Zhang et al. |
| 2020/0159532 A1 | 5/2020 | Zhang et al. |
| 2020/0159533 A1 | 5/2020 | Zhang et al. |
| 2020/0160162 A1 | 5/2020 | Zhang et al. |
| 2020/0160163 A1 | 5/2020 | Liu et al. |
| 2020/0160219 A1 | 5/2020 | Zhang et al. |
| 2020/0160220 A1 | 5/2020 | Zhang et al. |
| 2020/0160221 A1 | 5/2020 | Zhang et al. |
| 2020/0160222 A1 | 5/2020 | Zhang et al. |
| 2020/0168227 A1 | 5/2020 | Chen et al. |
| 2020/0174547 A1 | 6/2020 | Fang et al. |
| 2020/0183752 A1 | 6/2020 | Liu et al. |
| 2020/0241874 A1 | 7/2020 | Chen et al. |
| 2020/0257972 A1 | 8/2020 | Miniskar et al. |
| 2020/0302283 A1 | 9/2020 | Zhu et al. |
| 2020/0334041 A1 | 10/2020 | Zhang et al. |
| 2020/0334522 A1 | 10/2020 | Zhang et al. |
| 2020/0334525 A1 | 10/2020 | Tsai et al. |
| 2020/0334572 A1 | 10/2020 | Zhang et al. |
| 2020/0394522 A1 | 12/2020 | Liu et al. |
| 2020/0394523 A1 | 12/2020 | Liu et al. |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0192349 A1 | 6/2021 | Lian et al. |
| 2021/0264270 A1 | 8/2021 | Liu et al. |
| 2021/0286688 A1 | 9/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |
| 2021/0374510 A1 | 12/2021 | Liu et al. |
| 2021/0374511 A1 | 12/2021 | Liu et al. |
| 2021/0374540 A1 | 12/2021 | Yuan et al. |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102789413 A | 11/2012 |
| CN | 102903089 A | 1/2013 |
| CN | 104914977 A | 9/2015 |
| CN | 105389158 A | 3/2016 |
| CN | 107665364 A | 7/2016 |
| CN | 103534664 A | 8/2016 |
| CN | 105893419 A | 8/2016 |
| CN | 106156310 A | 11/2016 |
| CN | 106354568 A | 1/2017 |
| CN | 106406812 A | 2/2017 |
| CN | 106469291 A | 3/2017 |

(56) References Cited

FOREIGN PATENT DOCUMENTS

| | | | |
|---|---|---|---|
| CN | 106650922 A | 5/2017 | |
| CN | 106814639 A | 6/2017 | |
| CN | 107197297 A | 6/2017 | |
| CN | 106951587 A | 7/2017 | |
| CN | 106951962 A | 7/2017 | |
| CN | 106997236 A | 8/2017 | |
| CN | 107003988 A | 8/2017 | |
| CN | 107025629 A | 8/2017 | |
| CN | 107368174 A | 11/2017 | |
| CN | 107451654 A | 12/2017 | |
| CN | 107644254 A | 1/2018 | |
| CN | 107797913 A | 3/2018 | |
| CN | 104899641 A | 7/2018 | |
| CN | 108337000 A | 7/2018 | |
| CN | 108717570 A | 10/2018 | |
| CN | 109062540 A | 12/2018 | |
| CN | 109063820 A | 12/2018 | |
| CN | 109146057 A | 1/2019 | |
| CN | 109190754 A | 1/2019 | |
| CN | 109214509 A | 1/2019 | |
| CN | 109389219 A | 2/2019 | |
| CN | 109472353 A | 3/2019 | |
| CN | 110008952 A | 3/2019 | |
| CN | 109740739 A | 5/2019 | |
| CN | 109800877 A | 5/2019 | |
| CN | 109902745 A | 6/2019 | |
| CN | 110020616 A | 7/2019 | |
| CN | 109993296 A | 9/2019 | |
| CN | 112446460 A * | 3/2021 | ............ G06F 7/483 |
| EP | 0 789 296 A1 | 8/1997 | |
| EP | 2 703 945 A2 | 3/2014 | |
| EP | 3 106 997 A2 | 12/2016 | |
| EP | 3 407 268 A1 | 11/2018 | |
| JP | H03075860 A | 8/1989 | |
| JP | H09-265379 A | 10/1997 | |
| JP | 2009134433 A | 8/2012 | |
| JP | 2013514570 A | 4/2013 | |
| JP | 2015509183 A | 3/2015 | |
| JP | 1996087475 B2 | 5/2015 | |
| JP | 2015176158 A | 10/2015 | |
| JP | 2014199464 A | 10/2017 | |
| JP | 201810618 A | 1/2018 | |
| JP | 201826114 A | 2/2018 | |
| JP | 2018514872 A | 6/2018 | |
| JP | 2019519852 A | 7/2019 | |
| KR | 20100087845 A | 1/2009 | |
| KR | 20190034985 A | 4/2019 | |
| KR | 20190054454 A | 5/2019 | |
| WO | 2008153194 A1 | 12/2008 | |
| WO | 2016186823 A1 | 11/2016 | |
| WO | 2018/103736 A1 | 6/2018 | |
| WO | 2018140294 A1 | 8/2018 | |
| WO | 2018192500 A1 | 10/2018 | |
| WO | WO-2021036362 A1 * | 3/2021 | ............ G06F 7/483 |

OTHER PUBLICATIONS

Prado et al, QUENN: Quantization Engine for low-power Neural Networks; Dated Nov. 17, 2018; 9 pages.

Yang et al, Deploy Large-Scale Deep Neural Networks in Resource Constrained IoT Devices with Local Quantization Region; Dated May 28, 2018; 8 pages.

Li et al., "Using Artificial Neural Network for Predicting Thread Partitioning in Speculative Multithreading", IEEE, 2015, pp. 823-826.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Extended European Search Report for Application No. 19215861.6 mailed May 15, 2020.

Extended European Search Report for Application No. 19215862.4 mailed May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

Gysel Philipp et al., "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Yi Yang et al., "Deploy Large-Scale Deep Neural Networks in Resource Constrained IoT Devices with Local Quantization Region", arxiv.org, Cornell University Library, 201 Olin Library Cornell University Ithaca, NY 14853, May 24, 2018 (May 24, 2018), XP081234517.

European Patent Office, Extended European Search Report for European Application No. 19218382.0 dated Apr. 24, 2020.

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE.2018.844167 4 [retrieved on Aug. 20, 2018].

Song Mingcong et al., "In-Situ AI: Towards Autonomous and Incremental Deep Learning for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

European Patent Office, extended European search report for Application No. 19216754.2 mailed May 8, 2020.

Extended European Search Report for EP Application No. 19214324.6 mailed Oct. 1, 2020.

Yan JL, Zhang Y, Tu FB, et al; Research on low-power neural network computing chip technology; Sci Sin Inform, 2019, 49: 314-333, doi: 10.1360/N112018-00282, 20 pages.

Wang, Peisong, et al. "Two-step quantization for low-bit neural networks." Proceedings of the IEEE Conference on computer vision and pattern recognition. 2018. (Year: 2018) 9 pages.

Final Office Action received in U.S. Appl. No. 17/622,647, mailed on Nov. 6, 2025 (47 pages).

* cited by examiner

DATA PROCESSING METHOD, DEVICE, COMPUTER EQUIPMENT AND STORAGE MEDIUM

RELATED APPLICATIONS

This application is a national stage application of PCT/CN2020/110134, filed Aug. 20, 2020, which claims the benefit of priority from Chinese Application No. 201910888599.X, filed Sep. 19, 2019, and Chinese Application No. 201910784982.0, filed Aug. 23, 2019, the disclosures of which are incorporated herein by reference in their entirety.

TECHNICAL FIELD

The disclosure relates generally to the field of computer technologies, and more specifically to a data processing method, a device, a computer equipment, and a storage medium.

BACKGROUND

Neural network (NN) is a mathematical model or computation model that imitates the structure and function of the biological neural network. Through the training of sample data, the neural network continuously corrects the network weights and thresholds to make the error function drop in the direction of negative gradient to approach the expected output. NN is a widely used recognition and classification model, which is mostly used for function approximation, model recognition and classification, data compression and time series prediction, etc. NN has been applied to image recognition, speech recognition, natural language processing and other fields. However, as the complexity of NN increases, the amount of data and data dimensions are constantly increasing, which poses greater challenges to the data processing efficiency, storage capacity and access efficiency of operation devices. In related arts, quantization of the operation data in the NN is based on a fixed bit width, in other words, the operation data of floating point type is converted to the operation data of fixed point type to realize the compression of the operation data in the NN. However, in related arts, a same quantization scheme is adopted for the entire NN. Since there may be great differences between different operation data in the NN, adopting the same quantization scheme may lead to low precision and affect the result of data operation.

SUMMARY

In order to solve the above-mentioned technical problems, the present disclosure provides a data processing method, a device, a computer equipment, and a storage medium.

A first aspect of the present disclosure provides a neural network quantization method. For any layer to be quantized in the neural network, the method includes:
  determining a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient;
  quantizing each piece of data to be quantized according to a corresponding quantization parameter to obtain a piece of quantized data corresponding to each piece of data to be quantized; and
  obtaining a quantization result of the target data according to the quantized data corresponding to each piece of data to be quantized, so that an operation may be performed in the layer to be quantized according to the quantization result of the target data.

A second aspect of the present disclosure provides a neural network quantization device, for any layer to be quantized in the neural network, the neural network quantization device includes:
  a data determination module configured to determine a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient;
  a data quantization module configured to quantize each piece of data to be quantized according to a corresponding quantization parameter to obtain a piece of quantized data corresponding to each piece of data to be quantized; and a data operation module configured to obtain a quantization result of the target data according to the quantized data corresponding to each piece of data to be quantized, so that an operation may be performed in the layer to be quantized according to the quantization result of the target data.

A third aspect of the present disclosure provides an artificial intelligence chip including the above-mentioned neural network quantization device.

A fourth aspect of the present disclosure provides an electronic device including the above-mentioned artificial intelligence chip.

A fifth aspect of the present disclosure provides a board card including a storage device, an interface apparatus, a control device, and the artificial intelligence chip, where the artificial intelligence chip is connected to the storage device, the control device, and the interface apparatus, respectively; the storage device is configured to store data; the interface apparatus is configured to implement data transmission between the artificial intelligence chip and an external equipment; and the control device is configured to monitor a state of the artificial intelligence chip.

A sixth aspect of the present disclosure provides a non-transitory computer readable storage medium having a computer program instruction stored thereon, where when the computer program instruction is executed by a processor, the neural network quantization method is realized.

The embodiments of the present disclosure provide a neural network quantization method, a device, a computer equipment, and a storage medium. The neural network quantization method includes: determining a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient; quantizing each piece of data to be quantized according to a corresponding quantization parameter to obtain a piece of quantized data corresponding to each piece of data to be quantized; and obtaining a quantization result of the target data according to the piece of quantized data corresponding to each piece of data to be quantized, so that an operation may be performed in the layer to be quantized according to the quantization result of the target data. According to the neural network quantization method, the device, the computer equipment, and the storage medium provided in the embodiments of the present disclosure, a plurality of pieces of data to be quantized in the target data may be separately quantized according to the corresponding quantization parameter, which may reduce the storage space of data while ensuring the precision, ensure the accuracy and reliability of the operation result, and improve the operation efficiency. In addition, performing quantization also reduces the size of the neural network model and relaxes the performance requirements of a terminal running the neural network model.

Through the derivation of the technical features in the claims, the beneficial effect of the technical problems in the background may be achieved. According to the following detailed description of exemplary embodiments with reference to the accompanying drawings, other features and aspects of the present disclosure may become clear.

BRIEF DESCRIPTION OF THE DRAWINGS

The drawings herein are incorporated into the specification and constitute a part of the specification. The drawings together with the specification illustrate exemplary embodiments, features, and aspects of the present disclosure, and explain principles of the present disclosure.

DETAILED DESCRIPTION OF THE EMBODIMENTS

Figure 1:
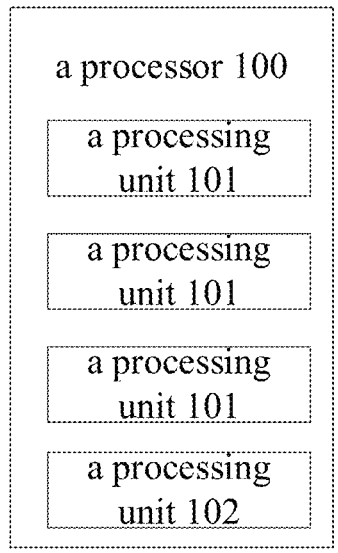
FIG. 1 shows a schematic diagram of a processor of a neural network quantization method according to an embodiment of the present disclosure.

Technical solutions in the embodiments of the present disclosure may be described clearly and completely hereinafter with reference to the accompanied drawings in the embodiments of the present disclosure. Apparently, the described embodiments are merely some rather than all embodiments of the present disclosure. All other embodiments obtained by those skilled in the art based on the embodiments of the present disclosure without creative efforts shall fall within the protection scope of the present disclosure.

It should be understood that the terms such as "first", "second", and the like used in the specification, the claims, and the accompanied drawings of the present disclosure are used for distinguishing between different objects rather than describing a particular order. The terms "include" and "comprise" used in the specification and claims are intended to indicate existence of the described features, whole bodies, steps, operations, elements, and/or components, but do not exclude the existence or addition of one or more other features, whole bodies, steps, operations, elements, components, and/or collections thereof.

It should also be understood that the terms used in the specification of the present disclosure are merely intended to describe specific examples rather than to limit the present disclosure. As used in the specification and claims of the present disclosure, singular forms of "a", "one", and "the" are intended to include plural forms unless the context clearly indicates other circumstances. It should be further understood that the term "and/or" used in the specification and claims of the present disclosure refers to any combination and all possible combinations of one or more listed relevant items, and the combinations are included.

As used in the specification and claims of the present disclosure, the term "if" may be interpreted as "when", "once", "in response to determining", or "in response to detecting" according to the context. Similarly, phrases such as "if determining" or "if detecting [the described conditions or events]" may be interpreted as "once determining", "in response to determining", "once detecting [the described conditions or events]", or "in response to detecting [the described conditions or events]".

As the complexity of neural network increases, the amount of data and data dimensions are constantly increasing, while a floating point number format is usually adopted to perform a neural network operation in the traditional neural network algorithm, so that the increasing data volume poses greater challenges to the data processing efficiency, storage capacity and access efficiency of the operation device. In order to solve the above-mentioned problems, in related arts, all data involved in the neural network operation is converted from floating point number to fixed point number. However, since each piece of data may differ from one another, or same data is different at different stages, only "converting floating point number to fixed point number" may lead to insufficient precision, thus affecting the operation result.

Data to be operated in the neural network is usually in the floating point number format or the fixed point number format with higher precision. When the neural network is run in a device carrying the neural network, the data to be operated in the floating point number format or the fixed point number format with higher precision leads to a large amount of operation and memory access overhead of the neural network operation. In order to improve the operation efficiency, according to the neural network quantization method, the device, the computer equipment, and the storage medium provided in the embodiments of the present disclosure, local quantization may be performed on the data to be operated in the neural network according to different types of data to be operated, the quantized data is usually in a fixed point number format with shorter bit width and lower precision. Using the quantized data with lower precision to perform the neural network operation may reduce the amount of operation and memory access. The quantized data is usually in a fixed point number format with shorter bit width. The data to be operated in the floating point number format may be quantized as the data to be operated in the fixed number format, and the data to be operated in the fixed point format with higher precision may be quantized as the data to be operated in the fixed point format with lower precision. Performing local quantization on the data by using the corresponding quantization parameter may reduce the storage space occupied by the stored data while ensuring the precision, ensure the accuracy and reliability of the operation result, and improve the efficiency of the operation. In addition, performing quantization also reduces the size of the neural network model and reduces the performance requirements of a terminal running the neural network model, so that the neural network model may be applied to terminals such as mobile phones with relatively limited computing power, size, and power consumption.

It should be understood that the quantization precision refers to the magnitude of an error between the quantized data and the pre-quantized data, and the quantization precision may affect the accuracy of the operation result of the neural network. The higher the quantization precision is, the higher the accuracy of the operation result may be, but the amount of operation and the memory access overhead may also be larger. Compared with the quantized data with a shorter bit width, the quantized data with a longer bit width has a higher quantization precision, and the accuracy is also higher when the quantized data with a longer bit width is used to perform the neural network operation. However, when being used for the neural network operation, the quantized data with a longer bit width requires more operation, the memory access overhead is higher, and the operation efficiency is lower. In the same way, for the same data to be quantized, the quantization precision of the quantized data obtained by using different quantization parameters may be different, which may produce different quantization results, and may also have different effects on the operation efficiency and accuracy of the operation result. When the neural network is being quantized, in order to balance the operation efficiency and the accuracy of the operation result, the bit width of the quantized data and quantization parameters that are more in line with the data characteristics of the data to be operated may be used.

The data to be operated in the neural network includes at least one of a weight, a neuron, a bias, and a gradient, and the data to be operated is a matrix including a plurality of elements. In a traditional neural network quantization method, all data to be operated is usually quantized and then operated. When the quantized data to be operated is used for operation, only a part of all the quantized data to be operated is used for the operation. For example, in a convolution layer, when the overall quantized input neuron is used for a convolution operation, according to the dimension and stride of the convolution kernel, quantized neurons with dimension equivalent to the convolution kernel are extracted from the overall quantized input neuron for the convolution operation. In a fully connected layer, when the overall quantized input neuron is used for a matrix multiplication operation, quantized neurons are extracted row by row from the overall quantized input neuron for the matrix multiplication operation. Therefore, in the traditional neural network quantization method, quantizing all the data to be operated and then performing operation according to part of the quantized data may lead to low operation efficiency; in addition, the quantizing all the data to be operated and then performing operation requires storing all the quantized data to be operated, which occupies a large storage space.

The neural network quantization method provided in the embodiments of the present disclosure may be applied to a processor, where the processor may be a Central Processing Unit (CPU) or an artificial intelligence processor (IPU) for performing artificial intelligence operations, where the artificial intelligence operations may include machine learning operations, brain-like operations, and the like, where the machine learning operations may include neural network operations, k-means operations, support vector machine operations, and the like. The artificial intelligence processor may include one or more of, for example, a GPU (Graphics Processing Unit), an NPU (Neural-Network Processing Unit), a DSP (Digital Signal Process) unit, and an FPGA (Field-Programmable Gate Array) chip. The artificial intelligence processor may include a plurality of operation units, and the plurality of operation units may perform operations in parallel. The present disclosure does not limit the specific types of the processors.

In a possible implementation manner, the processors mentioned in the present disclosure may include a plurality of processing units, and each processing unit may independently execute various assigned tasks, such as convolution operation task, pooling task, or fully connected task, etc. The present disclosure does not limit the processing unit and the tasks executed by the processing unit.

FIG. 1 shows a schematic diagram of a processor of a neural network quantization method according to an embodiment of the present disclosure. As shown in FIG. 1, a processor 100 may include a plurality of processing units 101 and a storage unit 102, where the plurality of processing units 101 are configured to execute instruction sequences, and the storage unit 102 is configured to store data, where the storage unit 102 may include an RAM (Random Access Memory) and a register file. The plurality of processing units 101 in the processor 100 may share part of the storage space, for example, the plurality of processing units 101 may share part of the RAM storage space and the register file, and may also have their own storage space at the same time.

Figure 2:
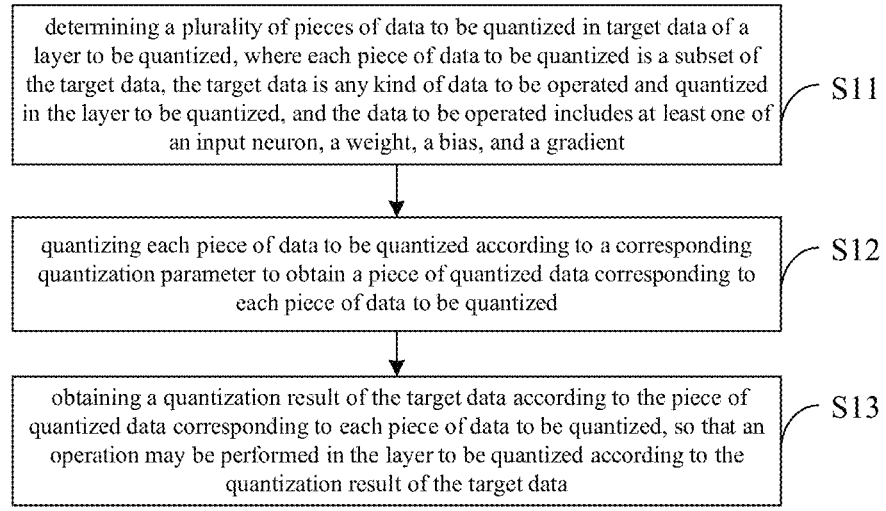
FIG. 2 shows a flowchart of a neural network quantization method according to an embodiment of the present disclosure.

FIG. 2 shows a flowchart of a neural network quantization method according to an embodiment of the present disclosure. As shown in FIG. 2, the neural network quantization method may be applied to any layer in the neural network, and the method includes steps S11 to S13. The method may be applied to the processor 100 shown in FIG. 1. The processing unit 101 is configured to execute steps S11 to S13. The storage unit 102 is configured to store data related to the processing procedure from step S11 to step S13, such as the data to be quantized, the quantization parameter, and the data bit width.

The step S11 includes: determining a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient.

A layer to be quantized in the neural network may be any layer in the neural network. Some or all of the layers in the neural network may be determined as the layers to be quantized according to requirements. When the neural network includes a plurality of layers to be quantized, each layer to be quantized may be continuous or discontinuous. Different neural networks may have different types of layers to be quantized, for example, the layer to be quantized may be a convolution layer, a fully connected layer, etc. The present disclosure does not limit the quantity and types of layers to be quantized.

In a possible implementation manner, the data to be operated includes at least one of an input neuron, a weight, a bias, and a gradient. The at least one of an input neuron, a weight, a bias, and a gradient in the layer to be quantized may be quantized according to requirements. The target data is any kind of data to be operated. For example, when the data to be operated is a neuron, a weight, and a bias, and the neuron and the weight to be quantized, then the neuron is target data 1, and the weight is target data 2.

When there are various kinds of target data in the layers to be quantized, the quantization method provided in the present disclosure may be adopted to quantize each kind of target data to obtain the quantized data corresponding to each target data, and then the quantized data of various kinds target data and the data to be operated that do not need to be quantized are used to perform the operations in the layers to be quantized.

An inference stage of the neural network operation may include a stage in which a forward operation is performed on a trained neural network to complete a set task. In the inference stage of the neural network, at least one of a neuron, a weight, a bias, and a gradient may be used as the data to be quantized and quantized according to the quantization method provided in the embodiments of the present disclosure, and then the quantized data is used to complete the operations in the layer to be quantized.

A fine-tuning stage of the neural network operation may include a stage in which a forward operation and a backward operation with a preset quantity iteration on the trained neural network to fine tune parameters to adapt the set task. In the fine-tuning stage of the neural network operation, at least one of a neuron, a weight, a bias, and a gradient may be quantized according to the quantization method provided in the embodiments of the present disclosure, and then the quantized data is used to complete the forward operation and the backward operation in the layer to be quantized.

A training stage of the neural network operation may include a stage in which an iterative training is performed on an initialized neural network to obtain a trained neural network, where the trained neural network may execute specific tasks. In the training stage of the neural network, at least one of a neuron, a weight, a bias, and a gradient may be quantized according to the quantization method provided in the embodiments of the present disclosure, and then the quantized data is used to complete the forward operation and the backward operation in the layer to be quantized.

A subset of target data may be used as the data to be quantized, and the target data may be designated as a plurality of subsets in different ways, where each subset may be used as a piece of data to be quantized. A piece of target data may be designated as a plurality of pieces of data to be quantized. A piece of target data may be designated as a plurality of pieces of data to be quantized according to the type of operation to be performed on the target data. For example, when the target data needs to be subjected to a convolution operation, the target data may be designated as a plurality of pieces of data to be quantized corresponding to the convolution kernel according to the height and width of the convolution kernel. When the target data is a left matrix that needs to be subjected to a matrix multiplication operation, the target data may be designated as a plurality of pieces of data to be quantized by rows. The target data may be designated as a plurality of pieces of data to be quantized at one time, or the target data may be designated as a plurality of pieces of data to be quantized in sequence according to the order of operations.

The target data may be also designated as a plurality of pieces of data to be quantized according to a preset data designation method. For example, the preset data designation method is: designating according to a fixed data size, or designating according to a fixed data shape.

After the target data is designated as a plurality of pieces of data to be quantized, each piece of data to be quantized may be quantized separately, and operations may be performed based on the quantized data. The quantization time required for a piece of data to be quantized is shorter than the overall quantization time of the target data. After one piece of data to be quantized is quantized, the quantized data may be used to perform subsequent operations, instead of waiting for all the pieces of data to be quantized in the target data are quantized before performing operations. Therefore, the quantization method of target data in the present disclosure may improve the operation efficiency of target data.

The step S12 includes: quantizing each piece of data to be quantized according to a corresponding quantization parameter to obtain a piece of quantized data corresponding to each piece of data to be quantized.

The quantization parameter corresponding to the data to be quantized may be one quantization parameter or a plurality of quantization parameters. The quantization parameter may include a parameter used for quantizing the data to be quantized, such as a position of a point. The point position may be used to determine the position of a decimal point in the quantized data. The quantization parameter may further include a scaling factor, an offset, and the like.

The method of determining the quantization parameter corresponding to the data to be quantized may include: after determining the quantization parameter corresponding to the target data, determining the quantization parameter corresponding to the target data as the quantization parameter of the data to be quantized. When the layer to be quantized includes a plurality of pieces of target data, each piece of target data may have a corresponding quantization parameter, and the quantization parameter corresponding to each piece of target data may be different or the same, which is not limited in the present disclosure. After the target data is designated as a plurality of pieces of data to be quantized, the quantization parameter corresponding to the target data may be determined as the quantization parameter corresponding to each piece of data to be quantized; at this time, the quantization parameter corresponding to each piece of data to be quantized is the same.

The method of determining the quantization parameter corresponding to the data to be quantized may further include: directly determining the quantization parameter corresponding to each piece of data to be quantized. The target data may not have a corresponding quantization parameter, or the target data may have a corresponding quantization parameter but the corresponding quantization parameter is not adopted by the data to be quantized. The corresponding quantization parameter may be directly set for each piece of data to be quantized, or the corresponding quantization parameter may be obtained by computing according to the data to be quantized. At this time, the quantization parameter corresponding to each piece of data to be quantized may be the same or different. For example, when a layer to be quantized is a convolution layer and the target data is a weight, the weight may be designated as a plurality of pieces of weight data to be quantized according to channels, and the pieces of weight data to be quantized of different channels may correspond to different quantization parameters. When the quantization parameter corresponding to each piece of data to be quantized is different, after each piece of data to be quantized is quantized using the corresponding quantization parameter, the quantization result obtained should not affect the operation of the target data.

The method of determining the quantization parameter corresponding to the target data or the method of determining the quantization parameter corresponding to the data to be quantized may include: directly determining the quantization parameter by looking up a preset quantization parameter, determining the quantization parameter by looking up a correspondence, or determining the quantization parameter by computing according to the data to be quantized. The method of determining the quantization parameter corresponding to the data to be quantized is taken as an example for description below.

The quantization parameter corresponding to the data to be quantized may be directly set. The preset quantization parameter may be stored in a set storage space, where the set storage space may be an on-chip or an off-chip storage space. For example, the preset quantization parameter may be stored in the set storage space; when each piece of data to be quantized is being quantized, the corresponding quantization parameter may be fetched from the set storage space for quantization. The quantization parameter corresponding to each kind of data to be quantized may be set according to an empirical value, or the stored quantization parameter corresponding to each kind of data to be quantized may be updated according to requirements.

The quantization parameter may be determined by looking up the correspondence between the data feature and the quantization parameter according to the data feature of each data to be quantized. For example, when the data distribution of the data to be quantized is sparse or dense, the data to be quantized may correspond different quantization parameters respectively. The quantization parameter corresponding to the data distribution of the data to be quantized may be determined by looking up the correspondence.

In addition, by adopting the set quantization parameter computation method, the quantization parameter corresponding to each layer to be quantized may be obtained according to each piece of data to be quantized. For example, the position of a point in the quantization parameter may be computed by using a rounding algorithm according to the maximum of the absolute value of the data to be quantized and the preset data bit width.

The step S13 includes: obtaining a quantization result of the target data according to the piece of quantized data corresponding to each piece of data to be quantized, so that an operation may be performed in the layer to be quantized according to the quantization result of the target data.

The set quantization algorithm may be used to quantize the data to be quantized according to the quantization parameter to obtain the quantized data. For example, by using the rounding algorithm as the quantization algorithm, the quantized data may be performed the rounding quantization according to the data bit width and the position of the point to obtain the quantized data. The rounding algorithm may include rounding up, rounding down, rounding to 0, and rounding off. The present disclosure does not limit the specific implementation of the quantization algorithm.

Each piece of data to be quantized may be quantized by using the corresponding quantization parameter. Since the quantization parameter corresponding to each piece of data to be quantized is more suitable for the features of the data to be quantized, the quantization precision of each kind of data to be quantized in each layer to be quantized is more in line with the operation requirements of the target data, and is more in line with the operation requirements of the layer to be quantized. On the premise of ensuring the accuracy of the operation results of the layer to be quantized, the operation efficiency of the layer to be quantized may be improved, and a balance between the operation efficiency of the layer to be quantized and the accuracy of the operation results may be achieved. Furthermore, the target data may be designated as a plurality of pieces of data, so that each piece of data to be quantized may be quantized separately. After a first piece of data to be quantized is quantized, an operation may be performed according to the quantization result, at the same time, a second piece of data to be quantized may be quantized, which may improve the operation efficiency of all the target data, and improve the operation efficiency of the layer to be quantized.

All pieces of quantized data of the pieces of data to be quantized may be combined to obtain the quantization result of the target data, or a set operation may be performed on all pieces of quantized data of the pieces of data to be quantized to obtain the quantization result of the target data. For example, each piece of quantized data of the data to be quantized may be weighted according to a set weight to obtain the quantization result of the target data, which is not limited in the present disclosure.

In the process of inference, training and fine-tuning of the neural network, the data to be quantized may be quantized offline or online. The offline quantization refers to performing the offline processing on the data to be quantized by using the quantization parameter; the online quantization refers to performing the online processing on the data to be quantized by using the quantization parameter. For example, the neural network is run on the artificial intelligence chip, the data to be quantized and the quantization parameter may be sent to an operation device outside the artificial intelligence chip for offline quantization, or the operation device outside the artificial intelligence chip may be used to perform the offline quantization on the pre-obtained data to be quantized and the quantization parameter. In the process of the artificial intelligence chip running the neural network, the artificial intelligence chip may perform online quantization on the data to be quantized using the quantization parameter. The present disclosure does not limit whether the quantization on the data to be quantized is online or offline.

For any layer to be quantized in the neural network, the neural network quantization method provided in the embodiments of the present disclosure includes: determining a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient; quantizing each piece of data to be quantized according to a corresponding quantization parameter to obtain a piece of quantized data corresponding to each piece of data to be quantized; and obtaining the quantized data of the target data according to the quantized data corresponding to each piece of data to be quantized, so that an operation may be performed in the layer to be quantized according to the quantitated data of the target data. After the target data is designated as a plurality of pieces of data to be quantized, the quantization process and operation process of each piece of data to be quantized may be performed in parallel, which may improve the quantization efficiency and operation efficiency of the target data, and improve the quantization efficiency and operation efficiency of the layer to be quantized and the neural network.

In a possible implementation manner, the layer to be quantized is a convolution layer, and the target data is an input neuron. The determining a plurality of pieces of data to be quantized in the target data of the layer to be quantized may include:

in the input neurons of the convolution layer, determining a plurality of pieces of data to be quantized corresponding to the convolution kernel according to the dimension and stride of the convolution kernel, where the dimension of the convolution kernel may include height, width, and a count of channels.

The dimension of the input neurons of the convolution layer may include a count of batches (B), channel (C), height (H), and width (W). When there are a plurality of batches of the input neurons, each batch of input neurons may be regarded as three-dimensional data whose dimensions are channel, height and width. Each batch of input neurons may correspond to a plurality of convolution kernels, and the count of channels of each batch of input neurons is consistent with the count of channels of each corresponding convolution kernel.

For any batch of input neurons, and for any one of the plurality of convolution kernels corresponding to the batch of input neurons, according to the height, width, and stride of the convolution kernel, the part of data (subset) corresponding to the batch of input neurons and the convolution kernel is determined to be a plurality of data to be quantized corresponding to the batch of input neurons and the convolution kernel.

Figure 3:
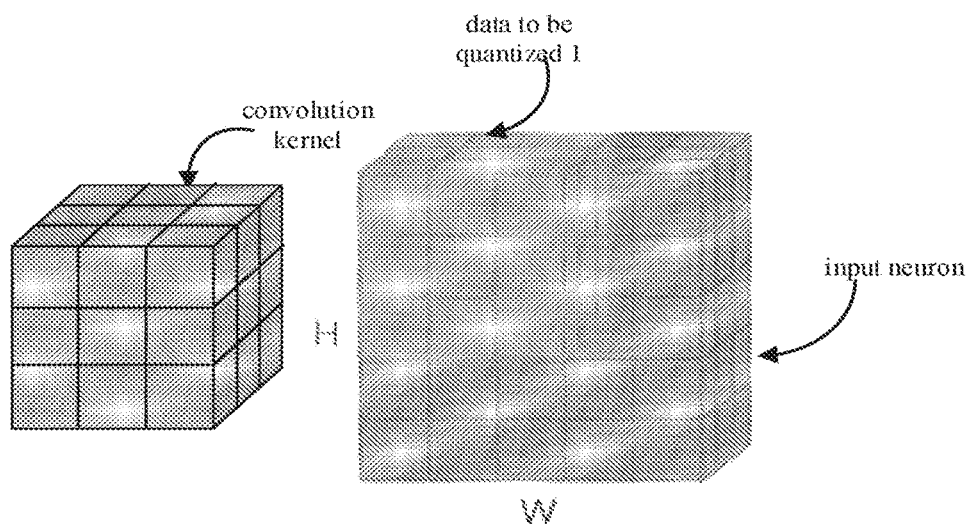
FIG. 3 shows a schematic diagram of determining data to be quantized in an input neuron according to a convolution kernel according to an embodiment of the present disclosure.
Figure 4:
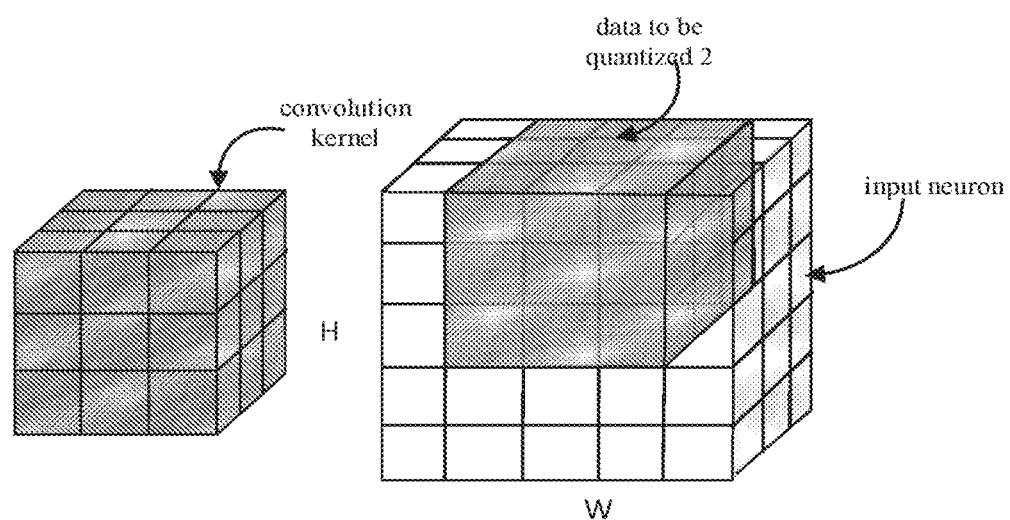
FIG. 4 shows a schematic diagram of determining data to be quantized in an input neuron according to a convolution kernel according to an embodiment of the present disclosure.

In a possible implementation manner, the dimension of each piece of data to be quantized determined in the input neurons is the same as the dimension of the convolution kernel. FIG. 3 shows a schematic diagram of determining an input neuron as the data to be quantized according to a convolution kernel according to an embodiment of the present disclosure. As shown in FIG. 3, the dimension of the input neuron is 5×5×3 (H×W×C), and the dimension of a corresponding convolution kernel (not shown in the figures) is 3×3×3 (H×W×C). A piece of data 1 to be quantized determined according to the convolution kernel is shown in FIG. 3, the color of the data 1 to be quantized in FIG. 3 is slightly lighter than the color of the input neuron, and the dimension of the data 1 to be quantized is 3×3×3 (H×W×C). FIG. 4 shows a schematic diagram of determining data to be quantized in an input neuron according to a convolution kernel according to an embodiment of the present disclosure. A piece of data 2 to be quantized determined according to the convolution kernel is shown in FIG. 4, the color of the data 2 to be quantized in FIG. 4 is slightly darker than the color of the input neuron, and the dimension of the data 2 to be quantized is 3×3×3 (H×W×C). Compared with the data 1 to be quantized, the data 2 to be quantized moves to the right in the W dimension direction by 1 grid consistent with the stride. The dimensions of the data 1 to be quantized and the data 2 to be quantized are consistent with the dimension of the convolution kernel.

It should be understood that, according to the method of determining the data 1 to be quantized and the data 2 to be quantized as shown in FIG. 3 and FIG. 4, other pieces of data to be quantized of the input neuron may be obtained sequentially according to the dimension and stride size of the convolution kernel, which may not be repeated here.

According to the dimension and stride of the convolution kernel, after the input neurons are designated as all pieces of the data to be quantized, the quantization may be performed in parallel for each piece of data to be quantized. The amount of the data to be quantized is smaller than the input neurons, and the amount of computation to quantize a piece of data to be quantized is smaller than the amount of computation to quantize the input neurons as a whole, therefore, the quantization method provided in the embodiment may improve the quantization speed of input neurons and the quantization efficiency. It is also possible to designate the input neurons as the data to be quantized according to the dimension and stride of the convolution kernel, and the convolution operation is performed on each piece of data to be quantized with the convolution kernel. The quantization and convolution operation of each piece of data to be quantized may be performed in parallel. The quantization method provided in the embodiment may improve the quantization efficiency and operation efficiency of the input neurons.

In a possible implementation manner, the dimension of each piece of data to be quantized determined in the input neurons may be different from the dimension of the convolution kernel. The dimension of each piece of data to be quantized may be smaller than the dimension of the convolution kernel, and at least one dimension of the convolution kernel is a multiple of the corresponding dimension of the data to be quantized. The dimension of each data to be quantized may also be greater than the dimension of the convolution kernel, and at least one dimension of the data to be quantized is a multiple of the corresponding dimension of the convolution kernel.

The dimension of each piece of data to be quantized may be smaller than the dimension of the convolution kernel. For example, if the dimension of a convolution kernel A is 8×8×3, the dimension of the data A1 to be quantized may be 4×8×3, the dimension of the data A2 to be quantized may be 4×8×3, and a subset formed by the data A1 to be quantized and the data A2 to be quantized is data that is convolved with the convolution kernel A, then the quantization result of the data A1 to be quantized and the quantization result of the data A2 to be quantized may be spliced, and a convolution operation is performed on the convolution kernel A with the splicing result.

The dimension of each piece of data to be quantized may be larger than the dimension of the convolution kernel. For example, if the dimension of a convolution kernel A is 8×8×3, the dimension of the data A1 to be quantized may be 16×8×3, then the quantization result of the data A1 to be quantized may be split, and the convolution operation is performed on the convolution kernel A with the splitting result.

In a possible implementation manner, in the process of quantizing the target data, the quantization parameter corresponding to the target data may be used for quantization. After the target data is designated as a plurality of pieces of data to be quantized, the quantization parameter corresponding to each piece of data to be quantized may be used for quantization. The quantization parameter corresponding to the piece of data to be quantized may be preset or computed according to the data to be quantized. No matter which method is adopted to determine the quantization parameter corresponding to each piece of data to be quantized, the quantization parameter of each piece of data to be quantized may be more in line with the quantization requirements of the data to be quantized. For example, when the corresponding quantization parameter is obtained by computing according to the target data, the quantization parameter may be computed by using the maximum and the minimum of each element in the target data. When the corresponding quantization parameter is obtained by computing according to the data to be quantized, the quantization parameter may be computed by using the maximum and minimum of each element in the data to be quantized. The quantization parameter of the data to be quantized may better fit the data features of the data to be quantized than the quantization parameter of the target data, so that the quantization result of the data to be quantized may be more accurate and the quantization precision may be higher.

In the embodiment of the present disclosure, in the input neurons of the convolution layer, a plurality of pieces of data to be quantized corresponding to the convolution kernel are determined according to the dimension and stride of the convolution kernel, where the dimension of the convolution kernel may include height, width, and the count of channels. After the plurality of pieces of data to be quantized are determined according to the dimension and stride of the convolution kernel, the computation amount for quantizing each piece of data to be quantized is less than the computation amount for quantizing the target data, which may improve the quantization efficiency of the target data. The quantization process and operation process of each piece of data to be quantized may be executed in parallel to improve the quantization efficiency and operation efficiency of the target data. Each piece of data to be quantized may be quantized according to the corresponding quantization parameter, since the quantization parameter may better meet the quantization requirements of the piece of data to be quantized, the quantization result of the piece of data to be quantized is more accurate.

In a possible implementation manner, the determining a plurality of pieces of data to be quantized in the target data of the layer to be quantized includes:

according to the dimension of the target data, determining a plurality of pieces of data to be quantized in the target data of the layer to be quantized, where the dimension of the target data may include a count of batches, channel, height, and width.

The target data may be designated according to one or more dimensions of the target data to obtain a plurality of pieces of data to be quantized.

The target data may be designated according to one dimension of the target data. For example, one or more batches of data in the target data of the layer to be quantized may be determined as one piece of data to be quantized. Assuming that target data B1 has 3 batches of data, if one batch of data in the target data is determined as one piece of data to be quantized, the target data B1 may be designated as 3 pieces of data to be quantized. It is also possible to determine one or more channels of data in the target data of the layer to be quantized as one piece of data to be quantized. Assuming that target data B2 corresponds to 4 channels, if the 2 channels of data in the target data are determined as one piece of data to be quantized, the target data B2 may be designated as 2 pieces of data to be quantized, and each piece of data to be quantized includes 2 channels of data. The target data may also be designated according to the height and width of the target data. For example, assuming that the target data is an input neuron with a dimension of 4×8×3, the input neuron may be designated as 2 pieces of data to be quantized based on half the width of the input neuron, and the dimension of each piece of data to be quantized is 4×4×3; the input neuron may also be designated as 2 pieces of data to be quantized based on half the height of the input neuron, and the dimension of each piece of data to be quantized is 2×8×3.

The target data may be designated according to a plurality of dimensions of the target data. For example, the target data may be designated according to the height and width of the target data. For example, assuming that the target data is an input neuron with a dimension of 4×8×3, the input neuron may be designated as 8 pieces of data to be quantized based on half the width of the input neuron and half the height of the input neuron, and the dimension of each piece of data to be quantized is 2×4×3.

In a possible implementation manner, the determining a plurality of pieces of data to be quantized in the target data of the layer to be quantized includes:

according to the real-time processing capability of the device running the neural network, determining a plurality of pieces of data to be quantized in the target data of the layer to be quantized, where the size of each piece of data to be quantized is positively correlated with the real-time processing capability.

The real-time processing capability of the device running the neural network includes: the speed of quantizing the target data by the device, the speed of operating the quantized data, the amount of data that the device may process when quantizing and operating the target data, and other pieces of information representing the processing capability of the device to process the target data. For example, the size of the data to be quantized may be determined according to the speed of quantizing the target data and the speed of operating the quantized data, so that the time of quantizing the data to be quantized is the same as the time of operating the quantized data. In this way, quantization and operation may be performed simultaneously, so that the operation efficiency of the target data may be improved. The stronger the real-time processing capability of the device running the neural network is, the larger the size of the data to be quantized may be.

In a possible implementation manner, the neural network quantization method further includes: computing the corresponding quantization parameter according to each piece of data to be quantized and the corresponding data bit width.

In the implementation manner, statistics may be performed on the data to be quantized, and the quantization parameter corresponding to the data to be quantized may be determined according to the statistical result and the data bit width. The quantization parameter may include one or more of the position of the point, the scaling factor, and the offset.

In a possible implementation manner, the computing the corresponding quantization parameter according to each piece of data to be quantized and the corresponding data bit width may include: when the quantization parameter does not include the offset, obtaining a first type of point position of each piece of data to be quantized according to the maximum of the absolute value $Z_1$ of each piece of data to be quantized and the corresponding data bit width, where the maximum of the absolute value $Z_1$ is the maximum obtained by taking the absolute value of the data to be quantized.

In the implementation manner, when the data to be quantized is symmetric data with respect to the origin, the quantization parameter may not include the offset. Assuming that $Z_1$ is the maximum of the absolute value of the elements of the data to be quantized, the data bit width corresponding to the data to be quantized is n, and A1 is the maximum that can be represented by the quantized data after the data to be quantized is quantized by using the data bit width n, $A_1$ is $2^{s_1}(2^{n-1}-1)$, $A_1$ needs to include $Z_1$, and $Z_1$ must be greater than $$\frac{A_1}{2},$$

therefore, there is a constraint of formula (1):

$$2^{s_1}(2^{n-1}-1) \geq Z_1 > 2^{s_1-1}(2^{n-1}-1) \qquad \text{formula (1)}.$$

The processor may compute a first type of point position $S_1$ according to the maximum of the absolute value $Z_1$ and the data bit width n of the data to be quantized. For example, the following formula (2) may be used to compute the first type of point position $S_1$ corresponding to the data to be quantized:

$$s_1 = \text{ceil}\left(\log_2\left(\frac{z_1}{2^{n-1}-1}\right)\right), \quad \text{formula (2)}$$

where ceil is a rounding up operation, $Z_1$ is the maximum of the absolute value of the data to be quantized, $S_1$ is the first type of point position, and n is the data bit width.

In a possible implementation manner, the computing the corresponding quantization parameter according to each piece of data to be quantized and the corresponding data bit width may include: when the quantization parameter includes the offset, obtaining a second type of point position $S_2$ of each piece of data to be quantized according to the maximum and the minimum of each piece of data to be quantized and the corresponding data bit width.

In the implementation manner, the maximum $Z_{max}$ and minimum $Z_{min}$ of the data to be quantized may be obtained first, and then the following formula (3) is used to perform an operation according to the maximum $Z_{max}$ and minimum $Z_{min}$, $$Z_2 = \frac{Z_{max} - Z_{min}}{2}. \quad \text{formula (3)}$$

Further, according to $Z_2$ and the corresponding data bit width, the second type of point position $S_2$ is obtained by using the following formula (4):

$$s_2 = \left(\log_2\left(\frac{Z_2}{2^{n-1}-1}\right)\right). \quad \text{formula (4)}$$

In the implementation manner, during quantization, since the maximum and minimum of the data to be quantized are stored under normal circumstances, the maximum of the absolute value is obtained directly based on the maximum and minimum of the stored data to be quantized without consuming more resources, which saves time to determine the statistical result.

In a possible implementation manner, the computing the corresponding quantization parameter according to each piece of data to be quantized and the corresponding data bit width may include: when the quantization parameter does not include the offset, obtaining the maximum of the quantized data according to each piece of data to be quantized and the corresponding data bit width; and obtaining a first type of scaling factor f' of each piece of data to be quantized according to the maximum of the absolute value of each piece of data to be quantized and the maximum of the quantized data, where the first type of scaling factor f' may include a first scaling factor $f_1$ and a second scaling factor $f_2$. The first scaling factor $f_1$ may be computed according to the following formula (5):

$$f_1 \frac{Z_1}{A_1} = \frac{Z_1}{2^{s_1}(2^{n-1}-1)}. \quad \text{formula (5)}$$

The second scaling factor $f_2$ may be computed according to the following formula (6):

$$f_2 = 2^{s_2} \times f_1 \quad \text{formula (6)}.$$

In a possible implementation manner, the computing the corresponding quantization parameter according to each piece of data to be quantized and the corresponding data bit width may include: according to the maximum and the minimum of each piece of data to be quantized, obtaining the offset of each piece of data to be quantized.

Figure 5:
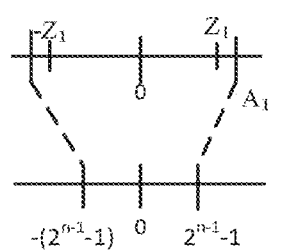
FIG. 5 shows a schematic diagram of symmetric fixed point numbers according to an embodiment of the present disclosure.
Figure 6:
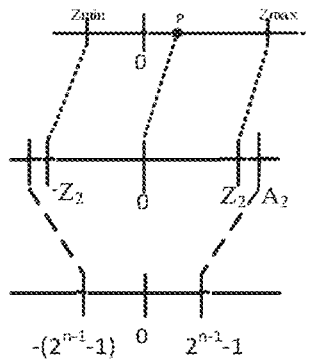
FIG. 6 shows a schematic diagram of fixed point numbers which an offset is introduced to according to an embodiment of the present disclosure.

In the implementation manner, FIG. 5 shows a schematic diagram of symmetric fixed numbers according to an embodiment of the present disclosure. As shown in FIG. 5, the number field of the data to be quantized is distributed with "0" as the symmetric center, and $Z_1$ is the maximum of the absolute value of all floating point numbers in the number field of the data to be quantized. In the FIG. 5, $A_1$ is the maximum of a floating point number that can be represented by an n-bit fixed point number, and the floating point number $A_1$ is converted to a fixed point number $(2^{n-1}-1)$. In order to avoid an overflow, $A_1$ needs to include $Z_1$. In practical operation, the floating point numbers related to the neural network operation tend to be normally distributed in a certain interval, but the floating point numbers do not necessarily distributed with "0" as the symmetric center, at this time, when the floating point numbers are represented by the fixed point numbers, overflow is likely to occur. In order to improve this situation, an offset is introduced in the quantization parameter. FIG. 6 shows a schematic diagram of fixed point numbers which an offset is introduced to according to an embodiment of the present disclosure. As shown in FIG. 6, the number field of the data to be quantized is not distributed with "0" as the symmetric center, $Z_{min}$ is the minimum among all floating point numbers in the number field of the data to be quantized, $Z_{max}$ is the maximum among all floating point numbers in the number field of the data to be quantized, $A_2$ is the maximum among the translated floating point numbers represented by an n-bit fixed point number, $A_2$ is $2^{s_2}(2^{n-1}-1)$, and P is the center point between $Z_{min}$–$Z_{max}$. In order to avoid a data "overflow", the number field of the data to be quantized is translated as a whole, so that the number field of the translated data to be quantized is distributed with "0" as the symmetric center, where the maximum of the absolute value in the number field of the translated data to be quantized is $Z_2$. As shown in FIG. 6, the offset is the horizontal distance between the "0" point and the "P" point, and this distance is called offset o.

According to the minimum $Z_{min}$ and the maximum $Z_{max}$, the offset may be computed by using the following formula (7):

$$o = \frac{Z_{max} - Z_{min}}{2}, \quad \text{formula (7)}$$

where o represents the offset, $Z_{min}$ represents the minimum among all the elements of the data to be quantized, and $Z_{max}$ represents the maximum among all the elements of the data to be quantized.

In a possible implementation manner, the computing the corresponding quantization parameter according to each piece of data to be quantized and the corresponding data bit width may include:

when the quantization parameter includes the offset, obtaining the maximum of the quantized data according to each piece of data to be quantized and the corresponding data bit width; and obtaining a second type of scaling factor f" of each piece of data to be quantized according to the maximum and the minimum of each piece of data to be quantized, and the maximum of the piece of quantized data, where the second type of scaling factor f" may include a third scaling factor $f_3$ and a fourth scaling factor $f_4$.

In the implementation manner, when the quantization parameter includes the offset, $A_2$ is the maximum that can be represented by the quantized data after the translated data to be quantized is quantized by using the data bit width n, $A_2$ is $2^{s_2}(2^{b-1}-1)$. The maximum of the absolute value $Z_2$ in the number field of the translated data to be quantized may be computed according to $Z_{max}$ and $Z_{min}$ of the data to be quantized, and then the third scaling factor $f_3$ may be computed according to the following formula (8):

$$f_3 = \frac{Z_2}{A_2} = \frac{z_2}{2^{s_2}(2^{n-1} - 1)}. \qquad \text{formula (8)}$$

Further, the fourth scaling factor $f_4$ may be computed according to the following formula (9):

$$f_4 = \frac{Z_2}{(2^{n-1} - 1)}. \qquad \text{formula (9)}$$

When the data to be quantized is being quantized, the data used for quantization is different due to different quantization parameters.

In a possible implementation manner, the quantization parameter may include the first type of point position $S_1$. The following formula (10) may be used to quantize the data to be quantized to obtain the quantized data $I_x$:

$$I_x = \text{round}\left(\frac{F_x}{2^{s_1}}\right), \qquad \text{formula (10)}$$

where $I_x$ is the quantized data, $F_x$ is the data to be quantized, round is a rounding operation.

When the quantization parameter includes the first type of point position $S_1$, the quantized data of the target data may be de-quantized according to formula (11) to obtain the de-quantized data of the target data $\bar{F}_x$:

$$\bar{F}_x = \left(\frac{F_x}{2^{s_1}}\right) \times 2^{s_1}. \qquad \text{formula (11)}$$

In a possible implementation manner, the quantization parameter may include the first type of point position and the first scaling factor. The following formula (12) may be used to quantize the data to be quantized to obtain the quantized data $I_x$:

$$I_x = \text{round}\left(\frac{F_x}{2^{s_1} \times f_1}\right). \qquad \text{formula (12)}$$

When the quantization parameter includes the first type of point position and the first scaling factor, the quantized data of the target data may be de-quantized according to formula (13) to obtain the de-quantized data of the target data $\bar{F}_x$:

$$\bar{F}_x = \text{round}\left(\frac{F_x}{2^{s_1} \times f_1}\right) \times 2^{s_1} \times f_1. \qquad \text{formula (13)}$$

In a possible implementation manner, the quantization parameter may include the second scaling factor. The following formula (14) may be used to quantize the data to be quantized to obtain the quantized data $I_x$:

$$I_x = \text{round}\left(\frac{F_x}{f_2}\right). \qquad \text{formula (14)}$$

When the quantization parameter includes the second scaling factor, the quantized data of the target data may be de-quantized according to formula (15) to obtain the de-quantized data of the target data $\bar{F}_x$:

$$\bar{F}_x = \text{round}\left(\frac{F_x}{f_2}\right) \times f_2. \qquad \text{formula (15)}$$

In a possible implementation manner, the quantization parameter may include the offset. The following formula (16) may be used to quantize the data to be quantized to obtain the quantized data $I_x$:

$$I_x = \text{round}(F_x - o) \qquad \text{formula (16)}.$$

When the quantization parameter includes the offset, the quantized data of the target data may be de-quantized according to formula (17) to obtain the de-quantized data of the target data $\bar{F}_x$:

$$\bar{F}_x = \text{round}(F_x - o) + o \qquad \text{formula (17)}.$$

In a possible implementation manner, the quantization parameter may include the second type of point position and the offset. The following formula (18) may be used to quantize the data to be quantized to obtain the quantized data $I_x$:

$$I_x = \text{round}\left(\frac{F_x - o}{2^{s_2}}\right). \qquad \text{formula (18)}$$

When the quantization parameter includes the second type of point position and the offset, the quantized data of the target data may be de-quantized according to formula (19) to obtain the de-quantized data of the target data $\bar{F}_x$:

$$\bar{F}_x = \text{round}\left(\frac{F_x - o}{2^{s_2}}\right) \times 2^{s_2} + o. \qquad \text{formula (19)}$$

In a possible implementation manner, the quantization parameter may include the second type of scaling factor f" and the offset o. The following formula (20) may be used to quantize the data to be quantized to obtain the quantized data $I_x$:

$$\hat{I}_x = \text{round}\left(\frac{F_x - o}{f''}\right). \qquad \text{formula (20)}$$

When the quantization parameter includes the second type of scaling factor f" and the offset o, the quantized data of the target data may be de-quantized according to formula (21) to obtain the de-quantized data of the target data $\hat{F}_x$:

$$\hat{F}_x = \text{round}\left(\frac{F_x - o}{f''}\right) \times f'' + o. \quad \text{formula (21)}$$

In a possible implementation manner, the quantization parameter may include the second type of point position, the second type of scaling factor f'', and the offset o. The following formula (22) may be used to quantize the data to be quantized to obtain the quantized data $I_x$:

$$I_x = \text{round}\left(\frac{F_x - o}{2^{s2} \times f''}\right). \quad \text{formula (22)}$$

When the quantization parameter includes the second type of point position, the second type of scaling factor f'', and the offset o, the quantized data of the target data may be de-quantized according to formula (23) to obtain the de-quantized data of the target data $\hat{F}_x$:

$$\hat{F}_x = \text{round}\left(\frac{F_x - o}{2^{s2} \times f''}\right) \times 2^{s2} \times f'' + o. \quad \text{formula (23)}$$

It is understandable that other rounding operation methods such as rounding up, rounding down, and rounding to zero may be also used to replace the rounding operation round in the above formulas. It can be understood that, in the case of a certain data bit width, for the quantized data obtained according to the point position, the more the decimal places are, the greater the quantization precision of the data to be quantized may be.

In a possible implementation manner, the step S11 includes: determining the quantization parameter corresponding to each type of data to be quantized in the layer to be quantized by looking up the correspondence between the data to be quantized and the quantization parameter. In a possible implementation manner, the quantization parameter corresponding to each type of data to be quantized in each layer to be quantized may be a stored preset value. A correspondence between the data to be quantized and the quantization parameter may be established for the neural network, where the correspondence may include the correspondence between each type of data to be quantized in each layer to be quantized and the quantization parameter, and the correspondence may be stored in a storage space that each layer may share and access. It is also possible to establish correspondences between a plurality of pieces of data to be quantized and the quantization parameters for the neural network, and each layer to be quantized corresponds to one of the correspondences, where the correspondence of each layer may be stored in a storage space exclusive to this layer, or the correspondence of each layer may be stored in a storage space that can be shared and accessed by each layer.

The correspondence between the data to be quantized and the quantization parameter may include correspondences between a plurality of pieces of data to be quantized and a plurality of quantization parameters corresponding thereto. For example, the correspondence A between the data to be quantized and the quantization parameter includes: two pieces of data to be quantized including a neuron and a weight in a layer 1 to be quantized, three quantization parameters including a point position 1, a scaling factor 1, and an offset 1 corresponding to the neuron, and two quantization parameters including a point position 2 and an offset 2 corresponding to the weight. The present disclosure does not limit the specific format of the correspondence between the data to be quantized and the quantization parameter.

In the implementation manner, the quantization parameter corresponding to each type of data to be quantized in the layer to be quantized may be determined by looking up the correspondence between the data to be quantized and the quantization parameter. Corresponding quantization parameter may be preset for each layer to be quantized, and the corresponding quantization parameter may be stored based on the correspondence, and the corresponding quantization parameter is used by the layer to be quantized after the looking up is completed. The method of obtaining the quantization parameter in the embodiment is simple and convenient.

Figure 7:
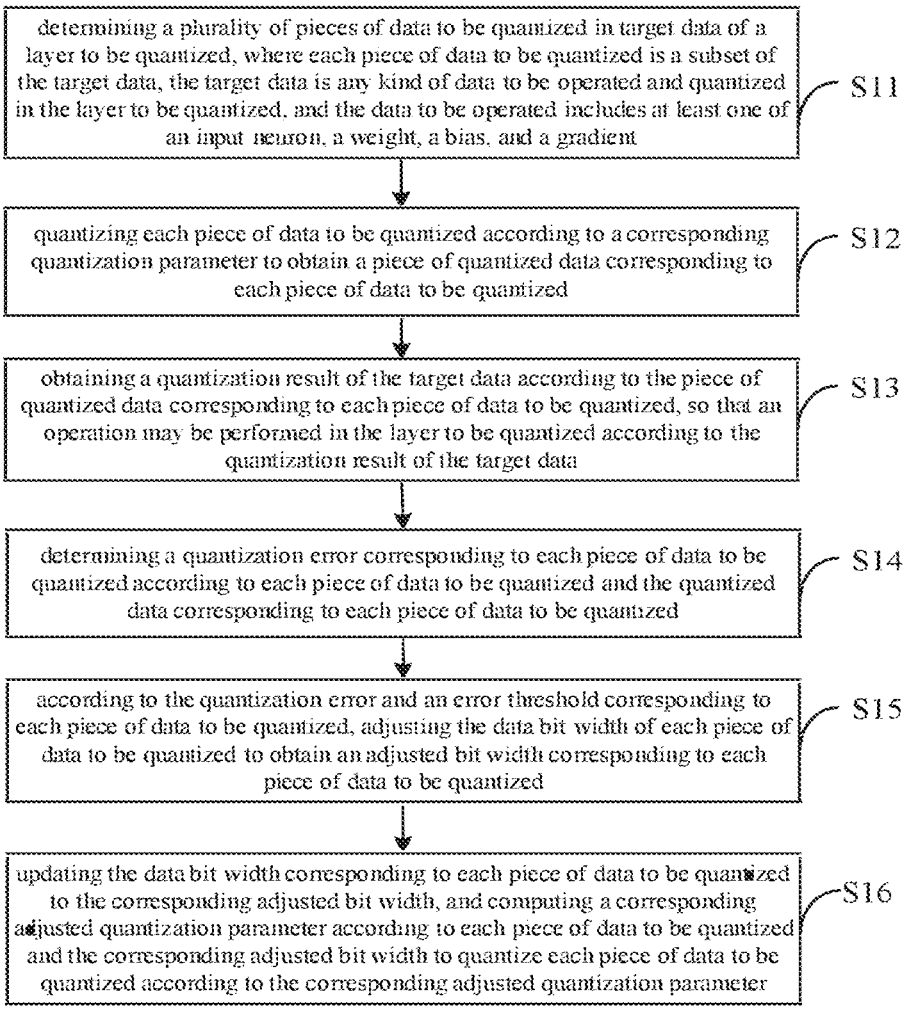
FIG. 7 shows a flowchart of a neural network quantization method according to an embodiment of the present disclosure.

FIG. 7 shows a flowchart of a neural network quantization method according to an embodiment of the present disclosure. In a possible implementation manner, as shown in FIG. 7, the neural network quantization method may further include steps S14-S16.

The step S14 includes: determining a quantization error corresponding to each piece of data to be quantized according to each piece of data to be quantized and the quantized data corresponding to each piece of data to be quantized.

The quantization error of the data to be quantized may be determined according to an error between the quantized data corresponding to the data to be quantized and the data to be quantized. The quantization error of the data to be quantized may be determined by using a set error computation method such as a standard deviation computation method, a root-mean-square error computation method, and the like.

According to the quantization parameter, the quantized data corresponding to the data to be quantized may be de-quantized to obtain the de-quantized data, and then, by using the formula (24), the quantization error $\text{diff}_{bit}$ of the data to be quantized may be determined according to the error between the de-quantized data and the data to be quantized, $$\text{diff}_{bit} = \log_2\left(\frac{\Sigma_i|\hat{F}_i| - \Sigma_i|F_i|}{\Sigma_i|F_i|} + 1\right), \quad (24)$$

where $F_i$ is the floating point value corresponding to the data to be quantized, where i is the subscript of the data to be quantized, and $\hat{F}_i$ is the de-quantized data corresponding to the floating point value.

By using the formula (25), the quantization error $\text{diff}_{bit}$ may be determined according to a quantization interval, a count of pieces of quantized data, and the corresponding data to be quantized, $$\text{diff}_{bit} = \log_2\left(\frac{C * 2^{-1} * m}{\Sigma_i|F_i|}\right), \quad (25)$$

where C is the quantization interval, m is the count of pieces of quantized data, $F_i$ is the floating point value corresponding to the data to be quantized, where is the subscript of the data to be quantized.

By using the formula (26), the quantization error $\text{diff}_{bit}$ may be further determined according to the quantized data and the corresponding de-quantized data, $$\text{diff}_{bit} = \log_2\left(\frac{\Sigma_i |\hat{F}_i - F_i|}{\Sigma_i |F_i|} + 1\right), \quad (26)$$

where $F_i$ is the floating point value corresponding to the data to be quantized, where is the subscript of the data to be quantized, and is the de-quantized data corresponding to the floating point value.

The step S15 includes: according to the quantization error and an error threshold corresponding to each piece of data to be quantized, adjusting the data bit width of each piece of data to be quantized to obtain an adjusted bit width corresponding to each piece of data to be quantized.

The error threshold may be determined based on the empirical value, and the error threshold may be used to indicate an expected value of the quantization error. When the quantization error is greater than or less than the error threshold, the data bit width corresponding to the data to be quantized may be adjusted to obtain the adjusted bit width corresponding to the data to be quantized. The data bit width may be adjusted to a longer bit width or a shorter bit width to increase or decrease the quantization precision.

The error threshold may be determined according to the maximum acceptable error. When the quantization error is greater than the error threshold, it means that the quantization precision cannot meet expectations, and the data bit width needs to be adjusted to a longer bit width. A smaller error threshold may be determined based on a higher quantization precision. When the quantization error is less than the error threshold, it means that the quantization precision is high, which may affect the operation efficiency of the neural network, in this case, the data bit width may be adjusted to a shorter bit width to appropriately decrease the quantization precision and improve the operation efficiency of the neural network.

The data bit width may be adjusted according to a stride of fixed bits, or the data bit width may be adjusted according to a variable adjustment stride based on the difference between the quantization error and the error threshold, which is not limited in the present disclosure.

The step S16 includes: updating the data bit width corresponding to each piece of data to be quantized to the corresponding adjusted bit width, and computing a corresponding adjusted quantization parameter according to each piece of data to be quantized and the corresponding adjusted bit width to quantize each piece of data to be quantized according to the corresponding adjusted quantization parameter.

After the adjusted bit width is determined, the data bit width corresponding to the data to be quantized may be updated to the adjusted bit width. For example, when the data bit width of the data to be quantized before updating is 8 bits, and the adjusted bit width is 12 bits, then the data bit width corresponding to the data to be quantized after updating is 12 bits. The adjusted quantization parameter corresponding to the data to be quantized may be obtained by computing according to the adjusted bit width and the data to be quantized. The data to be quantized may be re-quantized according to the adjusted quantization parameter corresponding to the data to be quantized to obtain the quantized data with higher or lower quantization precision, so that a balance between the quantization precision and the processing efficiency may be achieved in the layer to be quantized.

In the process of inference, training and fine-tuning of the neural network, the data to be quantized between each layer may be considered to have a certain correlation. For example, when the difference between the mean values of the data to be quantized in each layer is less than a set mean threshold, and the difference between the maximum values of the data to be quantized in each layer is also less than a set difference threshold, the adjusted quantization parameter of the layer to be quantized may be used as the adjusted quantization parameter of one or more subsequent layers for quantizing the data to be quantized in one or more subsequent layers after the layer to be quantized. In the training and fine-tuning process of the neural network, the adjusted quantization parameter in the layer to be quantized obtained during the current iteration may also be used to quantize the layer to be quantized in subsequent iterations.

In a possible implementation manner, the neural network quantization method further includes: using the quantization parameter of the layer to be quantized in one or more layers after the layer to be quantized.

The quantization of the data to be quantized according to the adjusted quantization parameter in the neural network may include: re-quantizing the data to be quantized by using the adjusted quantization parameter only in the layer to be quantized, and using the re-obtained quantized data for the operation of the layer to be quantized; and not re-quantizing the data to be quantized by using the adjusted quantization parameter in the layer to be quantized, but quantizing the data to be quantized by using the adjusted quantization parameter in one or more subsequent layers after the layer to be quantized, and/or quantizing the data to be quantized by using the adjusted quantization parameter in the layer to be quantized during the subsequent iterations; and re-quantizing the data to be quantized by using the adjusted quantization parameter in the layer to be quantized, and using the re-obtained quantized data for the operation of the layer to be quantized, and quantizing the data to be quantized by using the adjusted quantization parameter in one or more subsequent layers after the layer to be quantized, and/or quantizing the data to be quantized by using the adjusted quantization parameter in the layer to be quantized during the subsequent iterations, which is not limited in the present disclosure.

In the embodiment, the data bit width may be adjusted according to the error between the data to be quantized and the quantized data corresponding to the data to be quantized, and the adjusted quantization parameter may be obtained by computing according to the adjusted data bit width. By setting different error thresholds, different adjusted quantization parameters may be obtained to achieve different quantization requirements such as improving quantization precision or improving the operation efficiency. The adjusted quantization parameter obtained by computing according to the data to be quantized and the quantized data corresponding to the data to be quantized may be more in line with the data features of the data to be quantized. In this way, a quantization result being more in line with the needs of the data to be quantized may be achieved, and a better balance between the quantization precision and the processing efficiency may be achieved.

In a possible implementation manner, the step S15 may include:

when the quantization error is greater than a first error threshold, increasing the corresponding data bit width to obtain the corresponding adjusted bit width.

The first error threshold may be determined according to the maximum acceptable quantization error. The quantization error may be compared with the first error threshold, where when the quantization error is greater than the first error threshold, it can be considered that the quantization error is unacceptable, in this case, the quantization precision needs to be improved. By increasing the data bit width corresponding to the data to be quantized, the quantization precision of the data to be quantized may be improved.

The data bit width corresponding to the data to be quantized may be increased according to a fixed adjustment stride to obtain the adjusted bit width. The fixed adjustment stride may be N bits, where N is a positive integer. Each time the data bit width is adjusted, the data bit width may increase by N bits, and the data bit width after each adjustment=the original data bit width+N bits.

The data bit width corresponding to the data to be quantized may be increased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, where the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter of the data to be quantized may be obtained by computing according to the adjusted bit width. The quantized data obtained by re-quantizing the data to be quantized according to the adjusted quantization parameter has higher quantization precision than the quantized data obtained by using the quantization parameter before adjustment.

In a possible implementation manner, the neural network quantization method further includes:

computing an adjusted quantization error of each piece of data to be quantized according to the data to be quantized and the corresponding adjusted bit width; and increasing the corresponding adjusted bit width according to the adjusted quantization error and the first error threshold until the adjusted quantization error is less than or equal to the first error threshold.

When the data bit width corresponding to the data to be quantized is increased according to the quantization error, the adjusted bit width is obtained by adjusting the bit width once; the adjusted quantization parameter is obtained by computing according to the adjusted bit width; the adjusted quantized data is obtained by quantizing the data to be quantized according to the adjusted quantization parameter; and then the adjusted quantization error of the data to be quantized is obtained by computing according to the adjusted quantized data and the data to be quantized, where the adjusted quantization error may be still greater than the first error threshold, in other words, the data bit width obtained by adjusting once may not meet the adjustment purpose. When the adjusted quantization error is still greater than the first error threshold, the adjusted data bit width may continue to be adjusted, in other words, the data bit width corresponding to the data to be quantized may be increased many times, until the adjusted quantization error obtained according to the final obtained adjusted bit width and the data to be quantized is smaller than the first error threshold.

The adjustment stride that is increased many times may be a fixed adjustment stride or a variable adjustment stride. For example, the final data bit width=the original data bit width+B*N bits, where N is a fixed adjustment stride increased each time, and B is the increase times of data bit width. The final data bit width=the original data bit width+M1+M2+ . . . +Mm, where M1, M2 . . . Mm are variable adjustment strides increased each time.

In the embodiment, when the quantization error is greater than the first error threshold, the data bit width corresponding to the data to be quantized is increased to obtain the adjusted bit width corresponding to the data to be quantized. The data bit width may be increased by setting the first error threshold and the adjustment stride, so that the adjusted data bit width can meet the quantization requirement. When one adjustment does not meet the adjustment requirement, the data bit width may also be adjusted many times. The setting of the first error threshold and the adjustment stride enables the quantization parameter to be flexibly adjusted according to the quantization requirements to meet different quantization requirements, so that the quantization precision may be adaptively adjusted according to the data features of the data to be quantized.

In a possible implementation manner, the step S15 may include:

when the quantization error is less than a second error threshold, decreasing the corresponding data bit width to obtain the corresponding adjusted bit width, where the second error threshold is less than the first error threshold.

The second error threshold may be determined according to the acceptable quantization error and the expected operation efficiency of the neural network. The quantization error may be compared with the second error threshold, where when the quantization error is less than the second error threshold, it can be considered that the quantization error exceeds the expectation, but the operation efficiency is too low to be acceptable. The operation efficiency of the neural network may be improved by decreasing the quantization precision. The quantization precision of the data to be quantized may be decreased by decreasing the data bit width corresponding to the data to be quantized.

The data bit width corresponding to the data to be quantized may be decreased according to a fixed adjustment stride to obtain the adjusted bit width. The fixed adjustment stride may be N bits, where N is a positive integer. Each time the data bit width is adjusted, the data bit width may decrease by N bits, and the data bit width after each adjustment=the original data bit width−N bits.

The data bit width corresponding to the data to be quantized may be decreased according to a variable adjustment stride to obtain the adjusted bit width. For example, when the difference between the quantization error and the error threshold is greater than the first threshold, the data bit width may be adjusted according to an adjustment stride M1; when the difference between the quantization error and the error threshold is less than the first threshold, the data bit width may be adjusted according to an adjustment stride M2, where the first threshold is greater than the second threshold, and M1 is greater than M2. The variable adjustment stride may be determined according to requirements. The present disclosure does not limit the adjustment stride of the data bit width and whether the adjustment stride is variable.

The adjusted quantization parameter of the data to be quantized may be obtained by computing according to the adjusted bit width. The quantized data obtained by re-quantizing the data to be quantized using to the adjusted quantization parameter has higher quantization precision than the quantized data obtained by using the quantization parameter before adjustment.

In a possible implementation manner, the neural network quantization method further includes:

computing the adjusted quantization error of the data to be quantized according to the adjusted bit width and the data to be quantized; and continue to decreasing the corresponding adjusted bit width according to the adjusted quantization error and the second error threshold until the adjusted quantization error obtained according to the adjusted bit width and the data to be quantized is greater than or equal to the second error threshold.

When the data bit width corresponding to the data to be quantized is decreased according to the quantization error, the adjusted bit width is obtained by adjusting the bit width once; the adjusted quantization parameter is obtained by computing according to the adjusted bit width; the adjusted quantized data is obtained by quantizing the data to be quantized according to the adjusted quantization parameter; and then the adjusted quantization error of the data to be quantized is obtained by computing according to the adjusted quantized data and the data to be quantized, where the adjusted quantization error may be still smaller than the second error threshold, in other words, the obtained data bit width adjusted once may not meet the adjustment purpose. When the adjusted quantization error is still smaller than the second error threshold, the adjusted data bit width may continue to be adjusted, in other words, the data bit width corresponding to the data to be quantized may be decreased many times, until the adjusted quantization error obtained according to the final obtained adjusted bit width and the data to be quantized is greater than the second error threshold.

The adjustment stride that is decreased many times may be a fixed adjustment stride or a variable adjustment stride. For example, the final data bit width=the original data bit width−B*N bits, where N is a fixed adjustment stride decreased each time, and B is the decrease times of data bit width. The final data bit width=the original data bit width−M1−M2− . . . −Mm, where M1, M2 . . . Mm are variable adjustment strides decreased each time.

In the embodiment, when the quantization error is smaller than the second error threshold, the data bit width corresponding to the data to be quantized is decreased to obtain the adjusted bit width corresponding to the data to be quantized. The data bit width may be decreased by setting the second error threshold and the adjustment stride, so that the adjusted data bit width may meet the quantization requirement. When one adjustment does not meet the adjustment requirement, the data bit width may also be adjusted many times. The setting of the second error threshold and the adjustment stride enables the quantization parameter to be flexibly adjusted according to quantization requirements to meet different quantization requirements, so that the quantization precision may be adjusted, and a balance between the quantization precision and the operation efficiency of the neural network may be achieved.

In a possible implementation manner, the neural network quantization method further includes: when the quantization error is greater than the first error threshold, increasing the data bit width corresponding to the data to be quantized; when the quantization error is smaller than the second error threshold, decreasing the data bit width corresponding to the data to be quantized; and then obtaining the adjusted bit width corresponding to the data to be quantized.

Two error thresholds may be set at the same time, where the first error threshold is used to indicate that the quantization precision is too low, in this case, the data bit width may be increased; and the second error threshold is used to indicate that the quantization precision is too high, in this case, the data bit width may be decreased. The first error threshold is greater than the second error threshold, the quantization error of the data to be quantized may be compared with the two error thresholds at the same time, where when the quantization error is greater than the first error threshold, the data bit width may be increased; when the quantization error is less than the second error threshold, the data bit width may be decreased; and when the quantization error is between the first error threshold and the second error threshold, the data bit width may remain unchanged.

In the embodiment, by comparing the quantization error with the first error threshold and the second error threshold at the same time, the data bit width may be increased or decreased according to a comparison result, and the data bit width may be adjusted more flexibly by using the first error threshold and the second error threshold, so that an adjustment result of the data bit width is more in line with the quantization requirements.

In a possible implementation manner, in the fine-tuning stage and/or training stage of the neural network operation, the neural network quantization method further includes:

obtaining a variation range of the data to be quantized in a current iteration and historical iterations, where the historical iterations are the iterations before the current iteration; and according to the variation range of the data to be quantized, determining a target iteration interval corresponding to the data to be quantized to enable the layer to be quantized to update the quantization parameter of the data to be quantized according to the target iteration interval, where the target iteration interval includes at least one iteration.

A plurality of iterations occur during the fine-tuning stage and/or training stage of the neural network operation. Each layer to be quantized in the neural network performs a forward operation and a backward operation, and updates the weight of the layer to be quantized to complete an iteration. During a plurality of iterations, the variation range of the data to be quantized and/or the quantized data corresponding to the data to be quantized in the layer to be quantized may be used to determine whether the data to be quantized and/or the quantized data in different iterations may be quantized using the same quantization parameter. If the variation range of the data to be quantized in the current iteration and the historical iterations is small, for example, if the variation range of the data to be quantized is less than a set range variation threshold, the same quantization parameter may be used in a plurality of iterations with smaller variation range.

The quantization parameter corresponding to the data to be quantized may be determined by fetching a pre-stored quantization parameter. When the data to be quantized is quantized in different iterations, it is necessary to fetch the quantization parameter corresponding to the data to be quantized in each iteration. If the variation range of the data to be quantized and/or the variation range of the quantized data corresponding to the data to be quantized in a plurality of iterations is small, the same quantization parameter used in the plurality of iterations with small variation range may be temporarily stored. In each iteration, the temporarily stored quantization parameter may be used for quantization, instead of fetching the quantization parameter in each iteration.

The quantization parameter may be obtained by computing according to the data to be quantized and the data bit width. When the data to be quantized is quantized in different iterations, it is necessary to compute the quantization parameter in each iteration, respectively. If the variation range of the data to be quantized and/or the variation range of the quantized data corresponding to the data to be quantized in the plurality of iterations is small, the same quantization parameter may be used in the plurality of iterations with small variation range, in this case, a quantization parameter computed in a first iteration may be used directly in each iteration, instead of computing the quantization parameter in each iteration.

It should be understood that when the data to be quantized is a weight, the weight of each iteration is constantly updated. If the variation range of the weights of a plurality of iterations is small, or the variation range of the quantized data corresponding to the weights of a plurality of iterations is small, the same quantization parameter may be used to quantize the weights of the plurality of iterations.

The target iteration interval may be determined according to the variation range of the data to be quantized, where the target iteration interval includes at least one iteration. The same quantization parameter may be used in each iteration within the target iteration interval, in other words, the quantization parameter of the data to be quantized is no longer updated in each iteration within the target iteration interval. The neural network updates the quantization parameter of the data to be quantized according to the target iteration interval, the preset quantization parameter is not obtained or the quantization parameter is not computed in the iterations within the target iteration interval, in other words, the quantization parameter is not updated in the iterations within the target iteration interval. The preset quantization parameter may be obtained or the quantization parameter may be computed in the iterations out of the target iteration interval, in other words, the quantization parameter is updated in the iterations out of the target iteration interval.

It should be understood that the smaller the variation range of the data to be quantized or the variation range of the quantized data of the data to be quantized in a plurality of iterations is, the more the count of iterations within the determined target iteration interval may be. According to the computed data variation range, the target iteration interval corresponding to the computed data variation range may be determined by looking up the correspondence between a preset data variation range and an iteration interval. According to the computed data variation range, the target iteration interval may be further computed by using a set computation method. The present disclosure does not limit the computation method of the data variation range and the obtaining method of the target iteration interval.

In the embodiment, during the fine-tuning stage and/or training stage of the neural network operation, the variation range of the data to be quantized in the current iteration and historical iterations may be obtained, and the target iteration interval corresponding to the data to be quantized may be determined according to the variation range of the data to be quantized, so that the neural network may update the quantization parameter of the data to be quantized according to the target iteration interval. The target iteration interval may be determined according to the variation range of the data to be quantized or the variation range of the quantized data corresponding to the data to be quantized in a plurality of iterations. The neural network may determine whether to update the quantization parameter according to the target iteration interval. Since the data variation range of a plurality of iterations within the target iteration interval is small, the quantization precision may be also guaranteed even though the quantization parameter is not updated in the iterations within the target iteration interval. The quantization parameter is not updated in a plurality of iterations within the target iteration interval, which may reduce a count of fetching or computation of the quantization parameter, thereby improving the operation efficiency of the neural network.

In a possible implementation manner, the neural network quantization method further includes: according to the data bit width of the data to be quantized in the current iteration, determining the data bit width of the data to be quantized in the iterations within the target iteration interval to enable the neural network to determine the quantization parameter according to the data bit width of the data to be quantized in the iterations within the target iteration interval.

As described in the above-mentioned embodiments of the present disclosure, the quantization parameter of the data to be quantized may be preset or computed according to the data bit width corresponding to the data to be quantized. The data bit width corresponding to the data to be quantized in different layers to be quantized or the data bit width corresponding to the data to be quantized in the same layer to be quantized in different iterations may be adaptively adjusted according to the method provided in the above-mentioned embodiments of the present disclosure.

When the data bit width of the data to be quantized cannot be adjusted adaptively and is a preset data bit width, the data bit width of the data to be quantized in the iterations within the target iteration interval may be determined according to the preset data bit width of the data to be quantized in the current iteration. Each iteration within the target iteration interval may not use its own preset value.

When the data bit width of the data to be quantized can be adjusted adaptively, the data bit width of the data to be quantized in the iterations within the target iteration interval may be determined according to the data bit width of the data to be quantized in the current iteration. When the data bit width is adjusted adaptively, the data bit width may be adjusted once or many times. The data bit width of the data to be quantized after being adaptively adjusted in the current iteration may be used as the data bit width corresponding to each iteration within the target iteration interval, and the data bit width is no longer adaptively adjusted (updated) in each iteration within the target iteration interval. The data to be quantized may use the data bit width after being adaptively adjusted in the current iteration, or may use the data bit width before being adaptively adjusted, which is not limited in the present disclosure.

Since the variation range of the data to be quantized does not meet set conditions, the data bit width may be adaptively adjusted in other iterations out of the target iteration interval according to the method provided in the present disclosure to obtain the data bit width of the data to be quantized more in line with the current iteration. The computation method of the target iteration interval provided in the present disclosure may also be used to compute a new target iteration interval for use, therefore, while ensuring the quantization precision of the iterations out of the target iteration interval, the operation efficiency of the neural network is improved.

The data bit width of each iteration within the target iteration interval is the same, and each iteration may compute the corresponding quantization parameter according to the same data bit width. The quantization parameter may include at least one of a point position, a scaling factor, and an offset. The quantization parameter may be computed respectively in each iteration within the target iteration interval according to the same data bit width. When the quantization parameter includes the point position (including the first type of point position and the second type of point position), the scaling factor (including the first type of scaling factor and the second type of scaling factor), and the offset, in each iteration within the target iteration interval, the same data bit width may be used to compute the corresponding point position, scaling factor and offset, respectively.

While determining the data bit width of each iteration within the target iteration interval according to the data bit width of the current iteration, the corresponding quantization parameter of each iteration within the target iteration interval may be determined according to the quantization parameter of the current iteration. The quantization parameter of each iteration within the target iteration interval may not be computed again based on the same data bit width, which may further improve the operation efficiency of the neural network. The corresponding quantization parameter of each iteration within the target iteration interval may be determined according to all quantization parameters or part of the quantization parameters of the current iteration. When the corresponding quantization parameter of each iteration within the target iteration interval is determined according to part of the quantization parameters of the current iteration, the remaining quantization parameters still need to be computed in each iteration within the target iteration interval.

For example, the quantization parameter includes the second type of point position, the second type of scaling factor, and the offset. The data bit width and the second type of point position of each iteration within the target iteration interval may be determined according to the data bit width and the second type of point position of the current iteration. In this way, the second type of scaling factor and offset of each iteration within the target iteration interval need to be computed based on the same data bit width. Alternatively, the data bit width, the second type of point position, the second type of scaling factor, and the offset of each iteration within the target iteration interval may be determined according to the data bit width, the second type of point position, the second type of scaling factor, and the offset of the current iteration, in this case, the quantization parameter of each iteration within the target iteration interval does not need to be computed.

In the embodiment, according to the data bit width of the data to be quantized in the current iteration, the data bit width of the data to be quantized in the iterations within the target iteration interval may be determined to enable the neural network to determine the quantization parameter according to the data bit width of the data to be quantized in the iterations within the target iteration interval. The data bit width of each iteration within the target iteration interval may be determined according to the data bit width of the current iteration. Since the variation range of the data to be quantized in each iteration within the target iteration interval meets the set conditions, the quantization parameter may be computed by using the same data bit width, which may ensure the quantization precision of each iteration within the target iteration interval. Each iteration within the target iteration interval uses the same data bit width, which may also improve the operation efficiency of the neural network. In this way, a balance may be achieved between the accuracy of the operation result of the neural network after being quantized and the operation efficiency of the neural network.

In a possible implementation manner, the neural network quantization method further includes: according to the point position of the data to be quantized in the current iteration, determining the point position of the data to be quantized in the iterations within the target iteration interval, where the point position may include the first type of point position and/or the second type of point position.

The first type of point position of the data to be quantized in the iterations within the target iteration interval may be determined according to the first type of point position of the data to be quantized in the current iteration. The second type of point position of the data to be quantized in the iterations within the target iteration interval may be determined according to the second type of point position of the data to be quantized in the current iteration.

Among the quantization parameters, relative to the scaling factor and the offset, different point positions may have a greater impact on the quantization result of the same data to be quantized. The point position corresponding to the iterations within the target iteration interval may be determined according to the point position of the data to be quantized in the current iteration. When the data bit width cannot be adjusted adaptively, the preset point position of the data to be quantized in the current iteration may be used as the point position of the data to be quantized in each iteration within the target iteration interval; or the point position of the data to be quantized in the current iteration computed according to the preset data bit width may be used as the point position of the data to be quantized in each iteration within the target iteration interval. When the data bit width can be adjusted adaptively, the point position of the data to be quantized adjusted in the current iteration may be used as the point position of the data to be quantized in each iteration within the target iteration interval.

The point position of the data to be quantized in the iterations within the target iteration interval may be determined according to the point position of the data to be quantized in the current iteration, at the same time, the scaling factor of the data to be quantized in the iterations within the target iteration interval may be determined according to the scaling factor of the data to be quantized in the current iteration; and/or the offset of the data to be quantized in the iterations within the target iteration interval may be determined according to the offset of the data to be quantized in the current iteration.

The point position of the data to be quantized in the iterations within the target iteration interval may be determined according to the point position of the data to be quantized in the current iteration, at the same time, the data bit width of the data to be quantized in the iterations within the target iteration interval may be determined according to the data bit width of the data to be quantized in the current iteration, where the data bit width of the data to be quantized in the current iteration may be a preset data bit width of the current iteration or a data bit width after being adaptively adjusted.

In the embodiment, the point position of the data to be quantized in the iterations within the target iteration interval may be determined according to the point position of the data to be quantized in the current iteration. The point position in each iteration within the target iteration interval may be determined according to the point position in the current iteration. Since the variation range of the data to be quantized in each iteration within the target iteration interval meets the set conditions, the same point position may be used to ensure the quantization precision of each iteration within the target iteration interval. Using the same point position in each iteration within the target iteration interval may also improve the operation efficiency of the neural network. In this way, a balance may be achieved between the accuracy of the operation result of the neural network after being quantized and the operation efficiency of the neural network.

In a possible implementation manner, the obtaining the variation range of the data to be quantized in the current iteration and historical iterations may include:

according to the point position of the data to be quantized in the current iteration and the point position in the historical iteration corresponding to the current iteration determined according to an interval of the historical iteration, computing a moving average of the point position of the data to be quantized in each iteration interval, where the point position may include the first type of point position and/or the second type of point position; and obtaining a first data variation range according to a first moving average of the point position of the data to be quantized in the current iteration and a second moving average of the point position in an iteration corresponding to a previous iteration interval.

The determining the target iteration interval corresponding to the data to be quantized according to the variation range of the data to be quantized to enable the neural network to update the quantization parameter of the data to be quantized according to the target iteration interval may include:

determining the target iteration interval corresponding to the data to be quantized according to the first data variation range to enable the neural network to update the quantization parameter of the data to be quantized according to the target iteration interval.

According to the first type of point position of the data to be quantized in the current iteration and the first type of point position in the historical iteration corresponding to the current iteration determined according to the interval of the historical iteration, a moving average of the first type of point position of the data to be quantized in each iteration interval may be determined. According to a first moving average of the first type of point position of the data to be quantized in the current iteration, and a second moving average of the first type of point positions in an iteration corresponding to a previous iteration interval, the variation range of the data to be quantized may be obtained. Alternatively, according to the second type of point position of the data to be quantized in the current iteration and the second type of point position in the historical iteration corresponding to the current iteration determined according to the interval of the historical iteration, a moving average of the second type of point positions of the data to be quantized in each iteration interval may be determined. According to a first moving average of the second type of point positions of the data to be quantized in the current iteration, and a second moving average of the second type of point positions in an iteration corresponding to a previous iteration interval, the variation range of the data to be quantized may be obtained.

In a possible implementation manner, the historical iteration corresponding to the current iteration determined according to the interval of the historical iteration may be a historical iteration for computing the target iteration interval. The correspondence between the current iteration and the corresponding target iteration interval may include the followings.

The target iteration interval may be counted from the current iteration, and the target iteration interval may be recomputed from the next iteration after the target iteration interval corresponding to the current iteration ends. For example, the current iteration is the 100-th iteration, and the target iteration interval is 3, then the iterations within the target iteration interval include the 100-th iteration, the 101-th iteration, and the 102-th iteration; the target iteration interval corresponding to the 103-th iteration may be computed in the 103-th iteration, and a first iteration within the target iteration interval may be computed starting from the 103-th iteration. At this time, the current iteration is the 103-th iteration, and the historical iteration corresponding to the current iteration determined according to the interval of the historical iteration is the 100-th iteration.

The target iteration interval may be counted from the next iteration after the current iteration, and the target iteration interval may be recomputed from the last iteration within the target iteration interval. For example, the current iteration is the 100-th iteration, and the target iteration interval is 3, then the iterations within the target iteration interval include the 101-th iteration, the 102-th iteration, and the 103-th iteration; the target iteration interval corresponding to the 103-th iteration may be computed in the 103-th iteration, and a first iteration within the target iteration interval may be computed starting from the 104-th iteration. At this time, the current iteration is the 103-th iteration, and the historical iteration corresponding to the current iteration determined according to the interval of the historical iteration is the 100-th iteration.

The target iteration interval may be counted from the next iteration after the current iteration, and the target iteration interval may be recomputed from the next iteration after the target iteration interval ends. For example, the current iteration is the 100-th iteration, and the target iteration interval is 3, then the iterations within the target iteration interval include the 101-th iteration, the 102-th iteration, and the 103-th iteration; the target iteration interval corresponding to the 104-th iteration may be computed in the 104-th iteration, and a first iteration within the target iteration interval may be computed starting from the 105-th iteration. At this time, the current iteration is the 104-th iteration, and the historical iteration corresponding to the current iteration determined according to the interval of the historical iteration is the 100-th iteration.

Other correspondences between the current iteration and the target iteration interval may be determined according to requirements. For example, the target iteration interval may be counted from the N-th iteration after the current iteration, where N is greater than 1, which is not limited in the present disclosure.

It should be understood that the computed moving average of the point position of the data to be quantized corresponding to each iteration interval may include the first moving average of the point position of the data to be quantized in the current iteration, and the second moving average of the point position of the data to be quantized in the iteration corresponding to the previous iteration interval. The first moving average $m^{(t)}$ of the point position corresponding to the current iteration may be computed based on the formula (27):

$$m^{(t)} \leftarrow \alpha \times s^{(t)} + (1-\alpha) \times m^{(t-1)} \qquad \text{formula (27)},$$

where t is the current iteration; t−1 is the historical iteration determined according to the previous iteration interval; $m^{(t-1)}$ is the second moving average of the historical iteration determined according to the previous iteration interval; $s^{(t)}$ is the point position of the current iteration, which may be the first type of point position or the second type of point position; and α is a first parameter, where the first parameter may be a hyper-parameter.

In the embodiment, the moving average of the point position of the data to be quantized in each iteration interval may be computed according to the point position of the data to be quantized in the current iteration and the point position in the historical iteration corresponding to the current iteration determined according to the interval of the historical iteration; and the first data variation range may be obtained according to the first moving average of the point position of the data to be quantized in the current iteration and the second moving average of the point position in the iteration corresponding to the previous iteration interval. The target iteration interval corresponding to the data to be quantized may be determined according to the first data variation range to enable the neural network to update the quantization parameter of the data to be quantized according to the target iteration interval. The first data variation range may be used to indicate the variation trend of the point position, so that the target iteration interval may vary with the variation trend of the point position of the data to be quantized, and the size of each computed target iteration interval may vary with the variation trend of the point position of the data to be quantized. Since the quantization parameter is determined according to the target iteration interval, the quantized data obtained according to the quantization parameter may be more in line with the variation trend of the point position of the data to be quantized, therefore, the operation efficiency of the neural network may be improved while ensuring the quantization precision.

In a possible implementation manner, the obtaining the first data variation range according to the first moving average of the point position of the data to be quantized in the current iteration and the second moving average of the point position in the iteration corresponding to the previous iteration interval may include:

computing a difference between the first moving average and the second moving average; and determining an absolute value of the difference as the first data variation range.

The first data variation range $\text{diff}_{update1}$ may be computed based on the formula (28):

$$\text{diff}_{update1} = |m^{(t)} - m^{(t-1)}| = \alpha|s^{(t)} - m^{(t-1)}| \quad \text{formula (28).}$$

The target iteration interval corresponding to the data to be quantized may be determined according to the first data variation range to enable the neural network to update the quantization parameter of the data to be quantized according to the target iteration interval. The target iteration interval I may be computed based on the formula (29).

$$I = \frac{\beta}{\text{diff}_{update1}} - \gamma, \quad \text{formula (29)}$$

where β is a second parameter, and γ is a third parameter, where the second parameter and the third parameter may be hyper-parameters.

It should be understood that the first data variation range may be used to indicate the variation trend of the point position. The greater the first data variation range is, the more drastic the range variation of the quantized data may be, in this case, when the quantization parameter is updated, a shorter target iteration interval I is required.

In the embodiment, the difference between the first moving average and the second moving average may be computed; and the absolute value of the difference may be determined as the first data variation range. The accurate first data variation range may be obtained according to the difference between the moving averages.

In a possible implementation manner, the neural network quantization method further includes: obtaining a second data variation range according to the data to be quantized and the quantized data corresponding to the data to be quantized in the current iteration.

The determining the target iteration interval corresponding to the data to be quantized according to the variation range of the data to be quantized to enable the neural network to update the quantization parameter of the data to be quantized according to the target iteration interval may include:

determining the target iteration interval corresponding to the data to be quantized according to the first data variation range and the second data variation range of the data to be quantized to enable the neural network to update the quantization parameter of the data to be quantized according to the target iteration interval.

The second data variation range may be obtained according to the data to be quantized and the quantized data corresponding to the data to be quantized in the current iteration. The second data variation range may be also obtained according to the data to be quantized and the de-quantized data corresponding to the data to be quantized in the current iteration.

Similarly, the second data variation range $\text{diff}_{bit}$ of the data to be quantized and the de-quantized data corresponding to the data to be quantized in the current iteration may be computed based on the formula (30). The second data variation range $\text{diff}_{bit}$ of the data to be quantized and the de-quantized data corresponding to the data to be quantized may be also computed based on other error computation methods, which is not limited in the present disclosure.

$$\text{diff}_{bit} = \log_2\left(\frac{\Sigma_i|z_i^{(n)}| - \Sigma_i|z_i|}{\Sigma_i|z_i|} + 1\right), \quad \text{formula (30)}$$

where $z_i$ is the data to be quantized, and $z_i^{(n)}$ is the de-quantized data corresponding to the data to be quantized. It is understood that the second data variation range may be used to indicate the variation trend of the data bit width of the data to be quantized. The greater the second data variation range is, the more likely the data to be quantized needs to update the corresponding data bit width, and a shorter iteration is needed for updating. The greater the second data variation range is, the smaller the target iteration interval may be required.

In the embodiment, the second data variation range may be obtained according to the data to be quantized and the quantized data corresponding to the data to be quantized in the current iteration. The target iteration interval corresponding to the data to be quantized may be determined according to the first data variation range and the second data variation range of the data to be quantized to enable the neural network to update the quantization parameter of the data to be quantized according to the target iteration interval. Since the second data variation range may be used to indicate the variation requirements of the data bit width, the target iteration interval computed according to the first data variation range and the second data variation range may track the variation of the point position and the data bit width at the same time. In this way, the target iteration interval may better meet the data quantization requirements of the data to be quantized.

In a possible implementation manner, the obtaining the second data variation range according to the data to be quantized and the quantized data corresponding to the data to be quantized in the current iteration may include:

computing an error between the data to be quantized and the quantized data corresponding to the data to be quantized in the current iteration; and determining a square of the error as the second data variation range.

The second data variation range $\text{diff}_{update2}$ may be computed based on the formula (31):

$$\text{diff}_{update2} = \delta * \text{diff}_{bit}^2 \qquad \text{formula (31)},$$

where δ is a fourth parameter, where the fourth parameter may be a hyper-parameter.

It should be understood that different quantization parameters may be obtained according to different data bit widths, and then different quantized data may be obtained, in this case, different second data variation ranges may be generated. The second data variation range may be used to indicate the variation trend of the data bit width, where the greater the second data variation range is, the shorter target iteration interval may be needed to update the data bit width more frequently, in other words, the target iteration interval needs to be smaller.

In a possible implementation manner, the determining the target iteration interval corresponding to the data to be quantized according to the first data variation range and the second data variation range of the data to be quantized may include:

determining the target iteration interval corresponding to the data to be quantized according to the maximum of the first data variation range and the second data variation range.

The target iteration interval may be computed based on the formula (32), $$I = \frac{\beta}{\max(\text{diff}_{update1}, \text{diff}_{update2})} - \gamma, \qquad \text{formula (32)}$$

where β is a second parameter, and γ is a third parameter, where the second parameter and the third parameter may be hyper-parameters.

It should be understood that the variation trend of the data bit width and the point position may be indicated at the same time according to the target iteration interval obtained by using the first data variation range and the second data variation range, where when the variation trend of one of the first data variation range and the second data variation range is greater, the target iteration interval may vary accordingly. The target iteration interval may track the variation of the data bit width and the point position at the same time and make corresponding adjustments, so that the quantization parameter updated according to the target iteration interval may be more in line with the variation trend of the target data, and then the quantized data obtained according to the quantization parameter may better meet the quantitation requirements.

In a possible implementation manner, the obtaining the variation range of the data to be quantized in the current iteration and historical iterations may include:

when the current iteration is out of an update period, obtaining the data variation range of the data to be quantized in the current iteration and the historical iterations, where the update period includes at least one iteration.

In the training process and/or fine-tuning process of the neural network operation, the data to be quantized varies greatly in a plurality of iterations at the beginning of training or fine-tuning. If the target iteration interval is computed in the plurality of iterations at the beginning of training or fine-tuning, the computed target iteration interval may lose its usefulness. According to a preset update period, the target iteration interval is not computed in each iteration within the update period, and the target iteration interval is not applicable, so that a plurality of iterations may use the same data bit width or point position.

When the iteration goes out of the update period, in other words, when the current iteration is out of the update period, the data variation range of the data to be quantized in the current iteration and the historical iterations may be obtained; and the target iteration interval corresponding to the data to be quantized may be determined according to the variation range of the data to be quantized to enable the neural network to update the quantization parameter of the data to be quantized according to the target iteration interval. For example, if a preset update period is 100 iterations, then the target iteration interval is not computed from the first iteration to the 100-th iteration. When the iteration goes to the 101-th iteration, in other words, when the current iteration is the 101-th iteration, the current iteration is out of the update period, at this time, the target iteration interval corresponding to the data to be quantized in the 101-th iteration may be determined according to the variation range of the data to be quantized in the 101-th iteration and iterations from the first iteration to the 100-th iteration, and the computed target iteration interval may be used in the 101-th iteration or an iteration at an interval of a preset count of iterations from the 101-th iteration.

The update period may be counted from the preset count of iterations. For example, a plurality of iterations in the update period may be counted starting from the first iteration, or a plurality of iterations in the update period may be counted starting from the N-th iteration, which is not limited in the present disclosure.

In the embodiment, when an iteration goes out of the update period, the target iteration interval may be computed and used, which may avoid the problem that the target iteration interval is of little significance due to the greater variation of the data to be quantized in the early stage of the training process or fine-tuning process of the neural network operation, and the operation efficiency of the neural network may be further improved when the target iteration interval is used.

In a possible implementation manner, the neural network quantization method further includes:

when the current iteration is within the preset period, determining a period interval according to the current iteration, an iteration corresponding to the current iteration in a next period after the preset period, and an iteration interval corresponding to the current iteration;

determining the data bit width of the data to be quantized in the iteration within the period interval according to the data bit width of the data to be quantized corresponding to the current iteration; or determining the point position of the data to be quantized in the iteration within the period interval according to the point position of the data to be quantized corresponding to the current iteration.

There are a plurality of periods in the training process or fine-tuning process of the neural network operation, where each period may include a plurality of iterations. Data used for the neural network operation being completely computed once is referred to as a period. During the training process, as the iteration progresses, the weights of the neural network tend to be stable as the iteration goes on. After the training is stable, the data to be quantized such as the neuron, weight, bias and gradient may tend to be stable. When the data to be quantized tends to be stable, the data bit width and quantization parameter of the data to be quantized also tend to be stable. Similarly, in the fine-tuning process, after the fine-tuning is stable, the data bit width and quantization parameter of the data to be quantized also tend to be stable.

Therefore, a preset period may be determined according to a period in which the training is stable or the fine-tuning is stable. The period after a period in which the training is stable or the fine-tuning is stable may be determined as the preset period. For example, if the training is stable in the M-th period, the period after the M-th period may be taken as the preset period. In the preset period, a target iteration interval may be computed every other period, and the data bit width or the quantization parameter may be adjusted once according to the computed target iteration interval to reduce the update times of the data bit width or the quantization parameter and improve the operation efficiency of the neural network.

For example, the preset period is a period after the M-th period. In the M+1-th period, the target iteration interval computed according to the P-th iteration in the M-th period ends at the Q-th iteration in the M+1-th period, and the corresponding target iteration interval $I_{m+1}$ is computed according to the $Q_{m+1}$-th iteration in the M+1-th period. In the M+2-th period, the iteration corresponding to the $Q_{m+1}$-th iteration in the M+1-th period is the $Q_{m+2}$-th iteration. The period interval starts from the $Q_{m+1}$-th iteration in the M+1-th period to the $Q_{m+2}+I_{m+1}$-th iteration in the M+2-th period. In each iteration within the period interval, quantization parameters such as the data bit width or point position determined according to the $Q_{m+1}$-th iteration in the M+1-th period may be used.

In the embodiment, the period interval may be set. After the training or fine-tuning of the neural network operation is stable, the quantization parameters such as the data bit width or the point position may be updated every period according to the period interval. After the training or fine-tuning is stable, the update times of the data bit width or the point position may be reduced according to the period interval, which may improve the operation efficiency of the neural network while ensuring the quantization precision.

It should be noted that, for the sake of simple description, the above method embodiments are all described as a series of action combinations. However, those skilled in the art should be aware that the present disclosure is not limited by the described action order, because according to the present disclosure, certain steps may be executed in another order or executed simultaneously. Those skilled in the art should also be aware that the embodiments described in the specification are alternative embodiments and that the actions and modules involved are not necessary in the present disclosure.

It should be further noted that although the steps in the FIG. 2 and FIG. 7 are shown in sequence as indicated by the arrows, these steps are not necessarily executed in the order indicated by the arrows. Unless specifically stated in the present disclosure, the execution of these steps is not strictly limited in order, and these steps may be executed in other orders. In addition, at least part of the steps in FIG. 2 and FIG. 7 may include a plurality of sub-steps or stages. These sub-steps or stages are not necessarily executed at the same time, but may be executed at different times. The execution of these sub-steps or stages is not necessarily performed sequentially, but may be performed alternately with other steps or at least a part of the sub-steps or stages of other steps.

The embodiment of the present disclosure also provides a non-volatile computer readable storage medium on which a computer program instruction is stored. When the computer program instruction is executed by the processor, the above-mentioned neural network data quantization method is realized.

Figure 8:
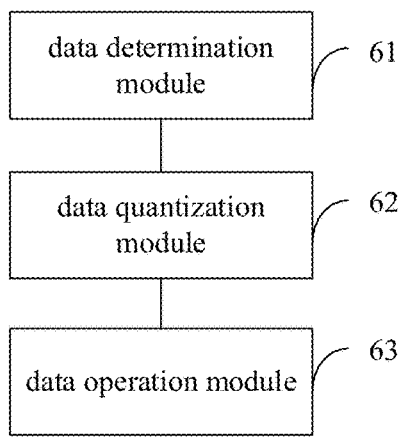
FIG. 8 shows a block diagram of a neural network quantization device according to an embodiment of the present disclosure.

FIG. 8 shows a block diagram of a neural network quantization device according to an embodiment of the present disclosure. As shown in FIG. 8, the device is applied to a processor 100 shown in FIG. 1, and the device includes a data determination module 61, a data quantization module 62 and a data operation module 63. A certain processing unit 101 is provided with a data determination module 61, a data quantization module 62, and a data operation module 63; alternatively, the data determination module 61, the data quantization module 62, and the data operation module 63 are respectively arranged in different processing units 101. A storage unit 102 is configured to store data related to the operation of the data determination module 61, the data quantization module 62, and the data operation module 63, such as the data to be quantized, the quantization parameter, and the data bit width.

The data determination module 61 is configured to determine a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient.

The data quantization module 62 is configured to quantize each piece of data to be quantized according to a corresponding quantization parameter to obtain a piece of quantized data corresponding to each piece of data to be quantized.

The data operation module 63 is configured to obtain a quantization result of the target data according to the piece of quantized data corresponding to each piece of data to be quantized, so that an operation may be performed in the layer to be quantized according to the quantization result of the target data.

In a possible implementation manner, the layer to be quantized is a convolution layer, and the target data is an input neuron. The data determination module may include:

a first determination sub-module configured to, in the input neuron of the convolution layer, determine a plurality of pieces of data to be quantized corresponding to the convolution kernel according to the dimension and stride of the convolution kernel, where the dimension of the convolution kernel may include height, width, and a count of channels.

In a possible implementation manner, the data determination module may include:

a second determination sub-module configured to, according to the dimension of the target data, determine a plurality of pieces of data to be quantized in the target data of the layer to be quantized, where the dimension of the target data may include a count of batches, channel, height, and width.

In a possible implementation manner, the second determination sub-module may include:

a determination sub-module based on a count of batches configured to determine one or more batches of data in the target data of the layer to be quantized as one piece of data to be quantized.

In a possible implementation manner, the second determination sub-module may include: a determination sub-module based on channel configured to determine one or more channels of data in the target data of the layer to be quantized as one piece of data to be quantized.

In a possible implementation manner, the data determination module may include:

a third determination sub-module configured to, according to the real-time processing capability of the device running the neural network, determine a plurality of pieces of data to be quantized in the target data of the layer to be quantized, where the size of each piece of data to be quantized is positively correlated with the real-time processing capability.

In a possible implementation manner, the neural network quantization device further includes:

a parameter determination sub-module configured to compute the corresponding quantization parameter according to the data to be quantized and the corresponding data bit width.

In a possible implementation manner, the parameter determination sub-module may include:

a first point position determination sub-module configured to, when the quantization parameter does not include the offset, obtain a first type of point position of each piece of data to be quantized according to a maximum of an absolute value of each piece of data to be quantized and a corresponding data bit width.

In a possible implementation manner, the parameter determination sub-module may include:

a first maximum determination sub-module configured to, when the quantization parameter does not include the offset, obtain the maximum of the quantized data according to each piece of data to be quantized and the corresponding data bit width; and a first scaling factor determination sub-module configured to obtain a first type of scaling factor of each piece of data to be quantized according to the maximum of the absolute value of each piece of data to be quantized and the maximum of the piece of quantized data.

In a possible implementation manner, the parameter determination sub-module may include:

a second point position determination sub-module configured to, when the quantization parameter includes the offset, obtain a second type of point position of each piece of data to be quantized according to the maximum and the minimum of each piece of data to be quantized and the corresponding data bit width.

In a possible implementation manner, the parameter determination sub-module may include:

a second maximum determination sub-module configured to, when the quantization parameter includes the offset, obtain the maximum of the piece of quantized data according to each piece of data to be quantized and the corresponding data bit width; and a second scaling factor determination sub-module configured to obtain a second type of scaling factor of each piece of data to be quantized according to the maximum and the minimum of the piece of data to be quantized, and the maximum of the piece of quantized data.

In a possible implementation manner, the parameter determination sub-module may include:

an offset determination sub-module configured to obtain the offset of each piece of data to be quantized according to the maximum and the minimum of each piece of data to be quantized.

In a possible implementation manner, the neural network quantization device further includes:

a first quantization error determination module configured to determine a quantization error corresponding to each piece of data to be quantized according to each piece of data to be quantized and the piece of quantized data corresponding to each piece of data to be quantized;

an adjusted bit width determination module configured to adjust the data bit width of each piece of data to be quantized to obtain an adjusted bit width corresponding to each piece of data to be quantized according to the quantization error and an error threshold corresponding to each piece of data to be quantized; and an adjusted quantization parameter determination module configured to update the data bit width corresponding to each piece of data to be quantized to a corresponding adjusted bit width, and compute a corresponding adjusted quantization parameter according to each piece of data to be quantized and the corresponding adjusted bit width to quantize each piece of data to be quantized according to the corresponding adjusted quantization parameter.

In a possible implementation manner, the adjusted bit width determination module may include:

a first adjusted bit width determination sub-module configured to, when the quantization error is greater than a first error threshold, increase the corresponding data bit width to obtain the corresponding adjusted bit width.

In a possible implementation manner, the neural network quantization device further includes:

a first adjusted quantization error module configured to compute an adjusted quantization error of each piece of data to be quantized according to the piece of data to be quantized and the corresponding adjusted bit width; and a first adjusting bit width cycle determination module configured to continue to increase the corresponding adjusted bit width according to the adjusted quantization error and the first error threshold until the adjusted quantization error is less than or equal to the first error threshold.

In a possible implementation manner, the adjusted bit width determination module may include:

a second adjusted bit width determination sub-module configured to, when the quantization error is less than a second error threshold, decrease the corresponding data bit width to obtain the corresponding adjusted bit width, where the second error threshold is less than the first error threshold.

In a possible implementation manner, the neural network quantization device further includes:

a second adjusted quantization error module configured to compute the adjusted quantization error of the data to be quantized according to the adjusted bit width and the data to be quantized; and a second adjusting bit width cycle determination module configured to continue to decrease the corresponding adjusted bit width according to the adjusted quantization error and the second error threshold until the adjusted quantization error obtained according to the adjusted bit width and the data to be quantized is greater than or equal to the second error threshold.

In a possible implementation manner, during a fine-tuning stage and/or training stage of a neural network operation, the neural network quantization device further includes:

a first data variation range determination module configured to obtain a variation range of the data to be quantized in a current iteration and historical iterations, where the historical iterations are the iterations before the current iteration; and a target iteration interval determination module configured to, according to the variation range of the data to be quantized, determine a target iteration interval corresponding to the data to be quantized to enable the layer to be quantized to update the quantization parameter of the data to be quantized according to the target iteration interval, where the target iteration interval includes at least one iteration.

In a possible implementation manner, the neural network quantization device further includes:

a first target iteration interval application module configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval.

In a possible implementation manner, the neural network quantization device further includes:

a second target iteration interval application module configured to, according to the point position of the data to be quantized in the current iteration, determine the point position of the data to be quantized in the iterations within the target iteration interval, where the point position may include the first type of point position and/or the second type of point position.

In a possible implementation manner, the first data variation range determination module may include:

a moving average computation sub-module configured to, according to the point position of the data to be quantized in the current iteration and the point position in the historical iteration corresponding to the current iteration determined according to an interval of the historical iteration, compute a moving average of the point position of the data to be quantized in each iteration interval, where the point position may include the first type of point position and/or the second type of point position; and a first data variation range determination sub-module configured to obtain a first data variation range according to a first moving average of the point position of the data to be quantized in the current iteration and a second moving average of the point position in an iteration corresponding to a previous iteration interval.

The target iteration interval determination module may include:

a first target iteration interval determination sub-module configured to determine the target iteration interval corresponding to the data to be quantized according to the first data variation range to enable the neural network to update the quantization parameter of the data to be quantized according to the target iteration interval.

In a possible implementation manner, the first data variation range determination sub-module may include:

a first range determination sub-module configured to compute a difference between the first moving average and the second moving average, and determine an absolute value of the difference as the first data variation range.

In a possible implementation manner, the neural network quantization device further includes:

a second data variation range determination module configured to obtain a second data variation range according to the data to be quantized and the quantized data corresponding to the data to be quantized in the current iteration.

The target iteration interval determination module may further include:

a second target iteration interval determination sub-module configured to determine the target iteration interval corresponding to the data to be quantized according to the first data variation range and the second data variation range of the data to be quantized to enable the neural network to update the quantization parameter of the data to be quantized according to the target iteration interval.

In a possible implementation manner, the second data variation range determination module may include:

a second range determination sub-module configured to compute an error between the data to be quantized and the quantized data corresponding to the data to be quantized in the current iteration, and determine a square of the error as the second data variation range.

In a possible implementation manner, the second target iteration interval determination sub-module may include:

a range determination sub-module configured to determine the target iteration interval corresponding to the data to be quantized according to the maximum of the first data variation range and the second data variation range.

In a possible implementation manner, the first data variation range determination module may include:

a second data variation range determination sub-module configured to, when the current iteration is out of an update period, obtain the data variation range of the data to be quantized in the current iteration and the historical iterations, where the update period includes at least one iteration.

In a possible implementation manner, the neural network quantization device further includes:

a period interval determination module configured to, when the current iteration is within the preset period, determine a period interval according to the current iteration, an iteration corresponding to the current iteration in a next period after the preset period, and an iteration interval corresponding to the current iteration;

a first period interval application module configured to determine the data bit width of the data to be quantized in the iteration within the period interval according to the data bit width corresponding to the data to be quantized of the current iteration; or a second period interval application module configured to determine the point position of the data to be quantized in the iteration within the period interval according to the point position of the data to be quantized corresponding to the current iteration.

According to the neural network quantization device provided in the embodiments of the present disclosure, a plurality of pieces of data to be quantized in the target data may be separately quantized according to the corresponding quantization parameter, which may reduce the storage space of data while ensuring the precision, ensure the accuracy and reliability of the operation result, and improve the operation efficiency. In addition, performing quantization also reduces the size of the neural network model and relaxes the performance requirements of a terminal running the neural network model, so that the neural network model may be applied to terminals such as mobile phones with relatively limited computing power, size, and power consumption.

It should be understood that the device embodiment described above is only schematic, and the device provided in the present disclosure may be implemented in other manners. For example, division of the units/modules is only logical function division and another division manner may be adopted during practical implementation. For example, a plurality of units or components may be combined or integrated into another system or some characteristics may be neglected or not performed.

In addition, unless otherwise specified, each functional unit/module in the embodiments of the disclosure may be integrated into a unit/module, each unit/module may also physically exist independently, and two or more units/modules may also be integrated into one unit/module. The integrated unit/module may be implemented in the form of hardware or a software functional unit/module.

If the integrated unit/module is implemented in the form of hardware, the hardware may be a digital circuit, an analogue circuit, and the like. The physical implementation of hardware may include, but is not limited to, a transistor, a memristor, and the like. Unless otherwise specified, the artificial intelligence processor may be any appropriate hardware processor, such as CPU, GPU, FPGA, DSP, ASIC, and the like. Unless otherwise specified, the storage unit may be any proper magnetic storage medium or magneto-optic storage medium, for example, an RRAM (Resistive Random Access Memory), a DRAM (Dynamic Random Access Memory), an SRAM (Static Random-Access Memory), an EDRAM (Enhanced Dynamic Random Access Memory), an HBM (High-Bandwidth Memory), an HMC (Hybrid Memory Cube), and the like.

If being implemented in the form of a software program module and sold or used as an independent product, the integrated unit/module may be stored in a computer-readable memory. Based on such an understanding, all or part of the technical solutions may be embodied in form of software product. The computer software product is stored in a memory, including a plurality of instructions configured to enable a computer device (which may be a PC, a server, a network device, or the like) to perform all or part of the operations of the method in each embodiment of the application. The memory may include various media capable of storing program codes such as a U disk, a mobile hard disk, a read-only memory (ROM), a random access memory (RAM), a magnetic disk, or an optical disk.

In a possible implementation manner, the present disclosure also provides a non-volatile computer readable storage medium on which the computer program instruction is stored. When the computer program instruction is executed by the processor, the above-mentioned data quantization method of the neural network is realized.

In a possible implementation manner, the present disclosure also provides an artificial intelligence chip including the above-mentioned neural network quantization device.

In a possible implementation manner, the present disclosure also provides a board card including: a storage device, an interface apparatus, a control device, and the above-mentioned artificial intelligence chip. The artificial intelligence chip is connected to the storage device, the control device, and the interface apparatus respectively; the storage device is configured to store data; the interface apparatus is configured to implement data transmission between the artificial intelligence chip and an external apparatus; and the control device is configured to monitor a state of the artificial intelligence chip.

Figure 9:
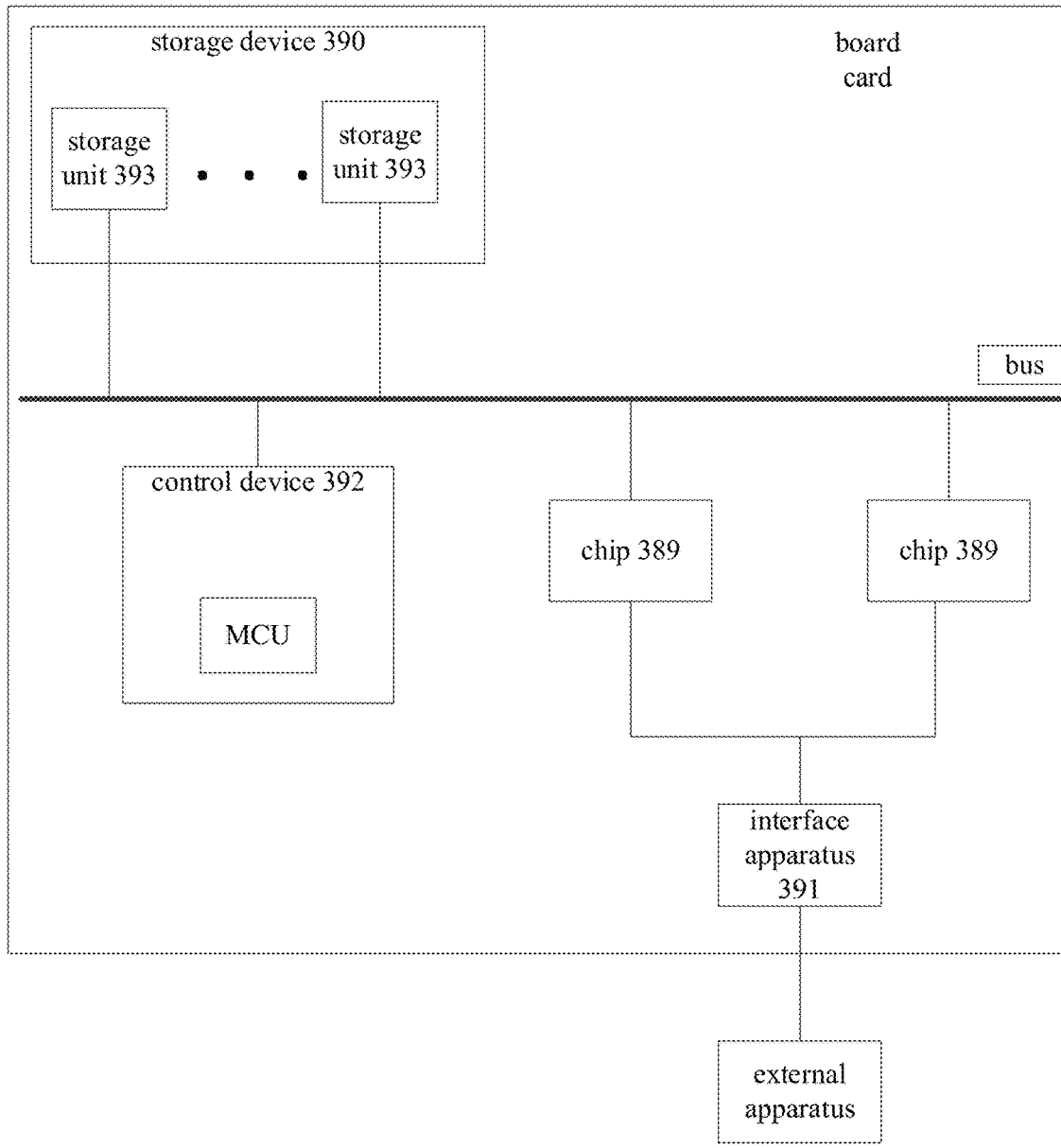
FIG. 9 shows a structural block diagram of a board card according to an embodiment of the present disclosure.

FIG. 9 shows a structural block diagram of a board card according to an embodiment of the present disclosure. As shown in FIG. 9, in addition to the above-mentioned chip 389, the board card may further include other supporting components, including but not limited to: a storage device 390, an interface apparatus 391, and a control device 392.

The storage device 390 is connected to the artificial intelligence chip through a bus, and is configured to store data. The storage device may include a plurality of groups of storage units 393, where each group of the storage units is connected with the artificial intelligence chip by a bus. It can be understood that each group of the storage units may be DDR SDRAM (Double Data Rate SDRAM (synchronized dynamic random access memory)).

The storage unit 102 in the processor 100 may include one or more groups of storage units 393. When the storage unit 102 includes a group of storage units 393, a plurality of processing units 101 share the storage unit 393 for data storage. When the storage unit 102 includes a plurality of groups of storage units 393, a dedicated group of storage units 393 may be provided for each processing unit 101, and a group of common storage units 393 may be provided for some or all of the plurality of processing units 101.

DDR may double a speed of SDRAM without increasing a clock rate. DDR allows reading data on rising and falling edges of the clock pulse. DDR is twice as fast as standard SDRAM. In an embodiment, the storage device may include 4 groups of the storage units, where each group of the storage units may include a plurality of DDR4 particles (chips). In an embodiment, the inner part of the artificial intelligence chip may include four 72-bit DDR4 controllers, in which 64 bits of the four 72-bit DDR4 controllers are used for data transmission, and 8 bits of the four 72-bit DDR4 controllers are used for ECC check. It may be understood that when DDR4-3200 particles are used in each group of the storage units, the theoretical bandwidth of data transmission can reach 25600 MB/s.

In an embodiment, each group of the storage units may include a plurality of DDR SDRAMs arranged in parallel. DDR can transmit data twice in one clock cycle. A controller for controlling DDR is provided in the chip, where the controller is used for controlling the data transmission and data storage of each storage unit.

The interface apparatus is electrically connected to the artificial intelligence chip, where the interface apparatus is configured to implement data transmission between the artificial intelligence chip and an external apparatus (such as a server or a computer). For example, in an embodiment, the interface apparatus may be a standard PCIE interface, and data to be processed is transmitted from the server to the chip through the standard PCIE interface to realize data transmission. Preferably, when a PCIE 3.0×16 interface is used for data transmission, the theoretical bandwidth can reach 16000 MB/s. In another embodiment, the interface apparatus may further include other interfaces. The present disclosure does not limit the specific types of the interfaces, as long as the interface units can implement data transmission. In addition, the computation result of the artificial intelligence chip is still transmitted back to an external apparatus (such as a server) by the interface apparatus.

The control device is electrically connected to the artificial intelligence chip, where the control device is configured to monitor the state of the artificial intelligence chip. Specifically, the artificial intelligence chip may be electrically connected to the control device through an SPI interface, where the control device may include an MCU (Micro Controller Unit). The artificial intelligence chip may include a plurality of processing chips, a plurality of processing cores, or a plurality of processing circuits, and may drive a plurality of loads. Therefore, the artificial intelligence chip can be in different working state such as multi-load state and light-load state. The regulation of the working states of a plurality of processing chips, a plurality of processing cores and or a plurality of processing circuits in the artificial intelligence chip may be implemented by the control device.

In a possible implementation manner, the present disclosure provides an electronic device including the artificial intelligence chip. The electronic device includes a data processing apparatus, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable apparatus, a transportation means, a household electrical appliance, and/or a medical apparatus. The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical apparatus may include a nuclear magnetic resonance spectrometer, a B-ultrasonic scanner, and/or an electrocardiograph.

In the above-mentioned embodiments, the description of each embodiment has its own focus. For parts that are not described in detail in an embodiment, please refer to related descriptions of other embodiments. The technical features of the above-mentioned embodiments may be combined arbitrarily. In order to make the description concise, not all possible combinations of the various technical features in the above-mentioned embodiments are described. However, as long as there is no contradiction in the combinations of these technical features, they should be regarded as the scope of this specification.

The foregoing may be better understood according to the following articles:

A1. A neural network quantization method, wherein for any layer to be quantized in a neural network, the method comprises:
determining a plurality of pieces of data to be quantized in target data of the layer to be quantized, where each piece of data to be quantized is a subset of the target data, the target data is any kind of data to be operated and quantized in the layer to be quantized, and the data to be operated includes at least one of an input neuron, a weight, a bias, and a gradient;
quantizing each piece of data to be quantized according to a corresponding quantization parameter to obtain a piece of quantized data corresponding to each piece of data to be quantized; and
obtaining a quantization result of the target data according to the quantized data corresponding to each piece of data to be quantized, so that an operation may be performed in the layer to be quantized according to the quantization result of the target data.

A2. The neural network quantization method of A1, wherein the layer to be quantized is a convolution layer, the target data is an input neuron, and the determining a plurality of pieces of data to be quantized in the target data of the layer to be quantized includes:
in the input neuron of the convolution layer, determining a plurality of pieces of data to be quantized corresponding to a convolution kernel according to a dimension and stride of the convolution kernel, where the dimension of the convolution kernel includes height, width, and a count of channels.

A3. The neural network quantization method of A1, wherein the determining a plurality of pieces of data to be quantized in the target data of the layer to be quantized includes:
determining a plurality of pieces of data to be quantized in the target data of the layer to be quantized according to a dimension of the target data, where the dimension of the target data includes a count of batches, channel, height, and width.

A4. The neural network quantization method of A3, wherein the determining a plurality of pieces of data to be quantized in the target data of the layer to be quantized according to the dimension of the target data includes:
determining one or more batches of data in the target data of the layer to be quantized as one piece of data to be quantized.

A5. The neural network quantization method of A3 or A4, wherein the determining a plurality of pieces of data to be quantized in the target data of the layer to be quantized according to the dimension of the target data includes:
determining one or more channels of data in the target data of the layer to be quantized as one piece of data to be quantized.

A6. The neural network quantization method of any one of A1-A5, wherein the determining a plurality of pieces of data to be quantized in the target data of the layer to be quantized includes:
according to a real-time processing capability of a device running the neural network, determining a plurality of pieces of data to be quantized in the target data of the layer to be quantized, where a size of each piece of data to be quantized is positively correlated with the real-time processing capability.

A7. The neural network quantization method of any one of A1-A6, further comprising: computing a corresponding quantization parameter according to each piece of data to be quantized and a corresponding data bit width.

A8. The neural network quantization method of A7, wherein the computing the corresponding quantization parameter according to each piece of data to be quantized and the corresponding data bit width includes:
when the quantization parameter does not include an offset, obtaining a first type of point position of each piece of data to be quantized according to a maximum of an absolute value of each piece of data to be quantized and the corresponding data bit width.

A9. The neural network quantization method of A7, wherein the computing the corresponding quantization parameter according to each piece of data to be quantized and the corresponding data bit width includes:
when the quantization parameter does not include the offset, obtaining a maximum of the piece of quantized data according to each piece of data to be quantized and the corresponding data bit width; and
obtaining a first type of scaling factor of each piece of data to be quantized according to the maximum of the absolute value of each piece of data to be quantized and the maximum of the piece of quantized data.

A10. The neural network quantization method of A7, wherein the computing the corresponding quantization parameter according to each piece of data to be quantized and the corresponding data bit width includes:
when the quantization parameter includes the offset, obtaining a second type of point position of each piece of data to be quantized according to a maximum and a minimum of each piece of data to be quantized and the corresponding data bit width.

A11. The neural network quantization method of A7, wherein the computing the corresponding quantization parameter according to each piece of data to be quantized and the corresponding data bit width includes:
when the quantization parameter includes the offset, obtaining the maximum of the piece of quantized data according to each piece of data to be quantized and the corresponding data bit width; and obtaining a second type of scaling factor of each piece of data to be quantized according to the maximum and the minimum of each piece of data to be quantized, and the maximum of the quantized data.

A12. The neural network quantization method of A7, wherein the computing the corresponding quantization parameter according to each piece of data to be quantized and the corresponding data bit width includes:

obtaining the offset of each piece of data to be quantized according to the maximum and the minimum of each piece of data to be quantized.

A13. The neural network quantization method of any one of A1-A12, further comprising:

determining a quantization error corresponding to each piece of data to be quantized according to each piece of data to be quantized and the piece of quantized data corresponding to each piece of data to be quantized;

adjusting the data bit width of each piece of data to be quantized to obtain an adjusted bit width corresponding to each piece of data to be quantized according to the quantization error and an error threshold corresponding to each piece of data to be quantized; and updating the data bit width corresponding to each piece of data to be quantized to a corresponding adjusted bit width, and computing a corresponding adjusted quantization parameter according to each piece of data to be quantized and the corresponding adjusted bit width to quantize each piece of data to be quantized according to the corresponding adjusted quantization parameter.

A14. The neural network quantization method of A13, wherein the adjusting the data bit width of each piece of data to be quantized to obtain an adjusted bit width corresponding to each piece of data to be quantized according to the quantization error and an error threshold corresponding to each piece of data to be quantized includes:

when the quantization error is greater than a first error threshold, increasing the corresponding data bit width to obtain the corresponding adjusted bit width.

A15. The neural network quantization method of A13 or A14, further comprising:

computing an adjusted quantization error of each piece of data to be quantized according to the piece of data to be quantized and the corresponding adjusted bit width; and continuing to increase the corresponding adjusted bit width according to the adjusted quantization error and the first error threshold until the adjusted quantization error is less than or equal to the first error threshold.

A16. The neural network quantization method of A13 or A14, wherein the adjusting the data bit width of each piece of data to be quantized to obtain an adjusted bit width corresponding to each piece of data to be quantized according to the quantization error and an error threshold corresponding to each piece of data to be quantized includes:

when the quantization error is less than a second error threshold, increasing the corresponding data bit width to obtain the corresponding adjusted bit width, where the second error threshold is less than the first error threshold.

A17. The neural network quantization method of A16, further comprising:

computing the adjusted quantization error of the data to be quantized according to the adjusted bit width and the piece of data to be quantized; and continuing to decrease the corresponding adjusted bit width according to the adjusted quantization error and the second error threshold until the adjusted quantization error obtained according to the adjusted bit width and the piece of data to be quantized is greater than or equal to the second error threshold.

A18. The neural network quantization method of any one of A1-A17, wherein during a fine-tuning stage and/or training stage of a neural network operation, the method further comprises:

obtaining a variation range of the data to be quantized in a current iteration and historical iterations, where the historical iterations are iterations before the current iteration; and according to the variation range of the data to be quantized, determining a target iteration interval corresponding to the data to be quantized to enable the layer to be quantized to update the quantization parameter of the data to be quantized according to the target iteration interval, where the target iteration interval includes at least one iteration.

A19. The neural network quantization method of A18, further comprising:

according to the data bit width of the data to be quantized in the current iteration, determining the data bit width of the data to be quantized in the iterations within the target iteration interval to enable the neural network to determine the quantization parameter according to the data bit width of the data to be quantized in the iterations within the target iteration interval.

A20. The neural network quantization method of A19, further comprising:

according to a point position of the data to be quantized in the current iteration, determining the point position of the data to be quantized in the iterations within the target iteration interval, where the point position includes the first type of point position and/or the second type of point position.

A21. The neural network quantization method of A18, wherein the obtaining the variation range of the data to be quantized in the current iteration and historical iterations includes:

according to the point position of the data to be quantized in the current iteration and the point position in a historical iteration corresponding to the current iteration determined according to an interval of the historical iteration, computing a moving average of the point position of the data to be quantized in each iteration interval, where the point position includes the first type of point position and/or the second type of point position; and obtaining a first data variation range according to a first moving average of the point position of the data to be quantized in the current iteration and a second moving average of the point position in an iteration corresponding to a previous iteration interval;

wherein the determining the target iteration interval corresponding to the data to be quantized according to the variation range of the data to be quantized to enable the layer to be quantized to update the quantization parameter of the data to be quantized according to the target iteration interval includes: determining the target iteration interval corresponding to the data to be quantized according to the first data variation range to enable the neural network to update the quantization parameter of the data to be quantized according to the target iteration interval.

A22. The neural network quantization method of A21, wherein the obtaining the first data variation range according to the first moving average of the point position of the data to be quantized in the current iteration and the second moving average of the point position in the iteration corresponding to the previous iteration interval includes:

computing a difference between the first moving average and the second moving average, and determining an absolute value of the difference as the first data variation range.

A23. The neural network quantization method of A22, further comprising: obtaining a second data variation range according to the data to be quantized and the quantized data corresponding to the data to be quantized in the current iteration, the determining the target iteration interval corresponding to the data to be quantized according to the variation range of the data to be quantized to enable the layer to be quantized to update the quantization parameter of the data to be quantized according to the target iteration interval includes:

determining the target iteration interval corresponding to the data to be quantized according to the first data variation range and the second data variation range of the data to be quantized to enable the neural network to update the quantization parameter of the data to be quantized according to the target iteration interval.

A24. The neural network quantization method of A23, wherein the obtaining the second data variation range according to the data to be quantized and the quantized data corresponding to the data to be quantized in the current iteration includes:

computing an error between the data to be quantized and the quantized data corresponding to the data to be quantized in the current iteration, and determining a square of the error as the second data variation range.

A25. The neural network quantization method of A23, wherein the determining the target iteration interval corresponding to the data to be quantized according to the first data variation range and the second data variation range of the data to be quantized includes:

determining the target iteration interval corresponding to the data to be quantized according to a maximum of the first data variation range and the second data variation range.

A26. The neural network quantization method of any one of A18-A25, wherein the obtaining the variation range of the data to be quantized in the current iteration and historical iterations includes:

when the current iteration is out of an update period, obtaining the data variation range of the data to be quantized in the current iteration and the historical iterations, where the update period includes at least one iteration.

A27. The neural network quantization method of any one of A18-A26, further comprising:

when the current iteration is within a preset period, determining a period interval according to the current iteration, an iteration corresponding to the current iteration in a next period after the preset period, and an iteration interval corresponding to the current iteration;

determining the data bit width of the data to be quantized in the iteration within the period interval according to the data bit width of the data to be quantized corresponding to the current iteration; or determining the point position of the data to be quantized in the iteration within the period interval according to the point position of the data to be quantized corresponding to the current iteration.

A28. A neural network quantization device, wherein for any layer to be quantized in a neural network, the device comprises:

a data determination module configured to determine a plurality of pieces of data to be quantized in target data of a layer to be quantized, where each piece of data to be quantized is a subset of the target data, the target data is any kind of data to be operated and quantized in the layer to be quantized, and the data to be operated includes at least one of an input neuron, a weight, a bias, and a gradient;

a data quantization module configured to quantize each piece of data to be quantized according to a corresponding quantization parameter to obtain a piece of quantized data corresponding to each piece of data to be quantized; and a data operation module configured to obtain a quantization result of the target data according to the piece of quantized data corresponding to each piece of data to be quantized, so that an operation may be performed in the layer to be quantized according to the quantization result of the target data.

A29. The neural network quantization device of A28, wherein the layer to be quantized is a convolution layer, the target data is an input neuron, and the data determination module includes:

a first determination sub-module configured to, in the input neuron of the convolution layer, determine a plurality of pieces of data to be quantized corresponding to a convolution kernel according to a dimension and stride of the convolution kernel, where the dimension of the convolution kernel includes height, width, and a count of channels.

A30. The neural network quantization device of A28, wherein the data determination module includes:

a second determination sub-module configured to determine a plurality of pieces of data to be quantized in the target data of the layer to be quantized according to the dimension of the target data, where the dimension of the target data includes a count of batches, channel, height, and width.

A31. The neural network quantization device of A30, wherein the second determination sub-module includes:

a determination sub-module based on a count of batches configured to determine one or more batches of data in the target data of the layer to be quantized as one piece of data to be quantized.

A32. The neural network quantization device of A30, wherein the second determination sub-module includes:

a determination sub-module based on channel configured to determine one or more channels of data in the target data of the layer to be quantized as one piece of data to be quantized.

A33. The neural network quantization device of any one of A28-A32, wherein the data determination module includes:

a third determination sub-module configured to, according to a real-time processing capability of a device running the neural network, determine a plurality of pieces of data to be quantized in the target data of the layer to be quantized, where a size of each piece of data to be quantized is positively correlated with the real-time processing capability.

A34. The neural network quantization device of any one of A28-A33, further comprising:

a parameter determination sub-module configured to compute the corresponding quantization parameter according to each piece of data to be quantized and a corresponding data bit width.

A35. The neural network quantization device of A34, wherein the parameter determination sub-module includes:

a first point position determination sub-module configured to, when the quantization parameter does not include an offset, obtain a first type of point position of each piece of data to be quantized according to a maximum of an absolute value of each piece of data to be quantized and the corresponding data bit width.

A36. The neural network quantization device of A34, wherein the parameter determination sub-module includes:

a first maximum determination sub-module configured to, when the quantization parameter does not include the offset, obtain a maximum of the piece of quantized data according to each piece of data to be quantized and the corresponding data bit width; and a first scaling factor determination sub-module configured to obtain a first type of scaling factor of each piece of data to be quantized according to the maximum of the absolute value of each piece of data to be quantized and the maximum of the piece of quantized data.

A37. The neural network quantization device of A34, wherein the parameter determination sub-module includes:

a second point position determination sub-module configured to, when the quantization parameter includes the offset, obtain a second type of point position of each piece of data to be quantized according to the maximum and a minimum of each piece of data to be quantized and the corresponding data bit width.

A38. The neural network quantization device of A34, wherein the parameter determination sub-module includes:

a second maximum determination sub-module configured to, when the quantization parameter includes the offset, obtain the maximum of the piece of quantized data according to each piece of data to be quantized and the corresponding data bit width; and a second scaling factor determination sub-module configured to obtain a second type of scaling factor of each piece of data to be quantized according to the maximum and the minimum of each piece of data to be quantized, and the maximum of the piece of quantized data.

A39. The neural network quantization device of A34, wherein the parameter determination sub-module includes:

an offset determination sub-module configured to obtain the offset of each piece of data to be quantized according to the maximum and the minimum of each piece of data to be quantized.

A40. The neural network quantization device of any one of A28-A39, further comprising:

a first quantization error determination module configured to determine a quantization error corresponding to each piece of data to be quantized according to each piece of data to be quantized and the piece of quantized data corresponding to each piece of data to be quantized;

an adjusted bit width determination module configured to adjust the data bit width of each piece of data to be quantized to obtain an adjusted bit width corresponding to each piece of data to be quantized according to the quantization error and an error threshold corresponding to each piece of data to be quantized; and an adjusted quantization parameter determination module configured to update the data bit width corresponding to each piece of data to be quantized to a corresponding adjusted bit width, and compute a corresponding adjusted quantization parameter according to each piece of data to be quantized and the corresponding adjusted bit width to quantize each piece of data to be quantized according to the corresponding adjusted quantization parameter.

A41. The neural network quantization device of A40, wherein the adjusted bit width determination module includes:

a first adjusted bit width determination sub-module configured to, when the quantization error is greater than a first error threshold, increase the corresponding data bit width to obtain the corresponding adjusted bit width.

A42. The neural network quantization device of A40 or A41, further comprising:

a first adjusted quantization error module configured to compute an adjusted quantization error of each piece of data to be quantized according to the data to be quantized and the corresponding adjusted bit width; and a first adjusting bit width cycle determination module configured to increase the corresponding adjusted bit width according to the adjusted quantization error and the first error threshold until the adjusted quantization error is less than or equal to the first error threshold.

A43. The neural network quantization device of A40 or A41, wherein the adjusted bit width determination module includes:

a second adjusted bit width determination sub-module configured to, when the quantization error is less than a second error threshold, decrease the corresponding data bit width to obtain the corresponding adjusted bit width, where the second error threshold is less than the first error threshold.

A44. The neural network quantization device of A43, further comprising:

a second adjusted quantization error module configured to compute the adjusted quantization error of the data to be quantized according to the adjusted bit width and the data to be quantized; and a second adjusting bit width cycle determination module configured to decrease the corresponding adjusted bit width according to the adjusted quantization error and the second error threshold until the adjusted quantization error obtained according to the adjusted bit width and the data to be quantized is greater than or equal to the second error threshold.

A45. The neural network quantization device of any one of A28-A44, wherein, during a fine-tuning stage and/or training stage of a neural network operation, the device further includes:

a first data variation range determination module configured to obtain a variation range of the data to be quantized in a current iteration and historical iterations, where the historical iterations are iterations before the current iteration; and a target iteration interval determination module configured to, according to the variation range of the data to be quantized, determine a target iteration interval corresponding to the data to be quantized to enable the layer to be quantized to update the quantization parameter of the data to be quantized according to the target iteration interval, where the target iteration interval includes at least one iteration.

A46. The neural network quantization device of A45, further comprising:

a first target iteration interval application module configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval.

A47. The neural network quantization device of A46, further comprising:

a second target iteration interval application module configured to, according to a point position of the data to be quantized in the current iteration, determine the point position of the data to be quantized in the iterations within the target iteration interval, where the point position includes the first type of point position and/or the second type of point position.

A48. The neural network quantization device of A45, wherein the first data variation range determination module includes:

a moving average computation sub-module configured to, according to the point position of the data to be quantized in the current iteration and point positions in the historical iterations corresponding to the current iteration determined according to an interval of the historical iteration, compute a moving average of the point position of the data to be quantized in each iteration interval, where the point position includes the first type of point position and/or the second type of point position; and a first data variation range determination sub-module configured to obtain a first data variation range according to a first moving average of the point position of the data to be quantized in the current iteration and a second moving average of the point position in an iteration corresponding to a previous iteration interval;

wherein the target iteration interval determination module includes: a first target iteration interval determination sub-module configured to determine the target iteration interval corresponding to the data to be quantized according to the first data variation range to enable the neural network to update the quantization parameter of the data to be quantized according to the target iteration interval.

A49. The neural network quantization device of A48, wherein the first data variation range determination sub-module includes:

a first range determination sub-module configured to compute a difference between the first moving average and the second moving average, and determine an absolute value of the difference as the first data variation range.

A50. The neural network quantization device of A49, further comprising:

a second data variation range determination module configured to obtain a second data variation range according to the data to be quantized and the quantized data corresponding to the data to be quantized in the current iteration, wherein the target iteration interval determination module includes: a second target iteration interval determination sub-module configured to determine the target iteration interval corresponding to the data to be quantized according to the first data variation range and the second data variation range of the data to be quantized to enable the neural network to update the quantization parameter of the data to be quantized according to the target iteration interval.

A51. The neural network quantization device of A50, wherein the second data variation range determination module includes:

a second range determination sub-module configured to compute an error between the data to be quantized and the quantized data corresponding to the data to be quantized in the current iteration, and determine a square of the error as the second data variation range.

A52. The neural network quantization device of A50, wherein the second target iteration interval determination sub-module includes:

a range determination sub-module configured to determine the target iteration interval corresponding to the data to be quantized according to a maximum of the first data variation range and the second data variation range.

A53. The neural network quantization device of any one of A45-A52, wherein the first data variation range determination module includes:

a second data variation range determination sub-module configured to, when the current iteration is out of an update period, obtain the data variation range of the data to be quantized in the current iteration and the historical iterations, where the update period includes at least one iteration.

A54. The neural network quantization device of any one of A45-A53, further comprising:

a period interval determination module configured to, when the current iteration is within a preset period, determine a period interval according to the current iteration, an iteration corresponding to the current iteration in a next period after the preset period, and an iteration interval corresponding to the current iteration;

a first period interval application module configured to determine the data bit width of the data to be quantized in the iteration within the period interval according to the data bit width of the data to be quantized corresponding to the current iteration; or a second period interval application module configured to determine the point position of the data to be quantized in the iteration within the period interval according to the point position of the data to be quantized corresponding to the current iteration.

A55. An artificial intelligence chip, comprising the neural network quantization device of any one of A28-A54.

A56. An electronic device, comprising the artificial intelligence chip of A55.

A57. A board card, comprising a storage device, an interface apparatus, a control device, and the artificial intelligence chip of A56, wherein the artificial intelligence chip is connected to the storage device, the control device, and the interface apparatus, respectively;

the storage device is configured to store data;

the interface apparatus is configured to implement data transmission between the artificial intelligence chip and an external apparatus; and the control device is configured to monitor a state of the artificial intelligence chip.

A58. The board card of A57, wherein the storage device includes a plurality of groups of storage units, where each group of the storage units is connected with the artificial intelligence chip by a bus, and the storage unit is a DDR SDRAM;

the chip includes a DDR controller configured to control data transmission and data storage of each storage unit; and the interface apparatus is a standard PCIE interface.

A59. A non-volatile computer readable storage medium, on which a computer program instruction is stored, wherein when the computer program instruction is executed by a processor, the neural network quantization method of any one of A1-A27 is realized.

The embodiments of the present disclosure are described in detail above, and specific examples are used in the specification to illustrate the principles and implementations of the present disclosure. The descriptions of the above-mentioned embodiments are only used to help understand the methods and core ideas of the present disclosure. At the same time, changes or modifications made by those skilled in the art based on the ideas of the present disclosure, the specific embodiments and the scope of application of the present disclosure, are all within the protection scope of the present disclosure. In summary, the content of this specification should not be construed as a limitation of the present disclosure.

The invention claimed is:

1. A neural network quantization method, comprising:
   determining a plurality of pieces of data to be quantized in target data of a layer in a neural network to be quantized, wherein each piece of data to be quantized is a subset of the target data, the target data is data to be operated and quantized in the layer to be quantized, and the data to be operated and quantized includes at least one of an input neuron, a weight, a bias, and a gradient;
   and wherein a quantity of the plurality of pieces of data depends on one or more dimensions of the target data and the quantity of the plurality of pieces of data is inversely correlated to a processing capability of a device implementing the neural network quantization;
   determining, for each piece of data, a corresponding quantization parameter based on a pre-determined correspondence, wherein the corresponding quantization parameter comprises one or more of the following: a decimal point position, a scaling factor, or an offset;
   quantizing each piece of data to be quantized according to the corresponding quantization parameter to obtain a piece of quantized data corresponding to each piece of data to be quantized, wherein the plurality of pieces of data are quantized in parallel;
   obtaining a quantization result of the target data according to the piece of quantized data corresponding to each piece of data to be quantized, so that an operation is performed in the layer to be quantized according to the quantization result of the target data;
   determining a quantization error corresponding to the target data, wherein the determining of the quantization error comprises:
      determining a difference between the plurality of pieces of data to be quantized and a plurality of pieces of de-quantized data of the plurality of quantized data; or
      determining a difference as a total quantization interval over the plurality of pieces of data to be quantized;
      wherein the quantization error is an average of the differences over a sum of the plurality of pieces of data to be quantized; and
   according to the quantization error and an error threshold determined based on an empirical value, adjusting a data bit width of each piece of data to be quantized to obtain an adjusted bit width corresponding to each piece of data to be quantized.

2. The neural network quantization method of claim 1, wherein the layer to be quantized is a convolution layer, the target data is an input neuron, and the determining a plurality of pieces of data to be quantized in the target data of the layer to be quantized includes:
   in the input neuron of the convolution layer, determining a plurality of pieces of data to be quantized corresponding to a convolution kernel according to a dimension and stride of the convolution kernel, where the dimension of the convolution kernel includes height, width, and a count of channels.

3. The neural network quantization method of claim 1, wherein the determining the plurality of pieces of data to be quantized in the target data of the layer to be quantized includes:
   determining a plurality of pieces of data to be quantized in the target data of the layer to be quantized according to a dimension of the target data, where the dimension of the target data includes a count of batches, channel, height, and width, wherein the determining a plurality of pieces of data to be quantized in the target data of the layer to be quantized according to the dimension of the target data includes:
      determining one or more batches of data in the target data of the layer to be quantized as one piece of data to be quantized; or
      determining one or more channels of data in the target data of the layer to be quantized as one piece of data to be quantized.

4. The neural network quantization method of claim 1, wherein the determining a plurality of pieces of data to be quantized in the target data of the layer to be quantized includes:
   according to a real-time processing capability of a device running the neural network, determining a plurality of pieces of data to be quantized in the target data of the layer to be quantized, where a size of each piece of data to be quantized is positively correlated with the real-time processing capability.

5. The neural network quantization method of claim 1, further comprising:
   computing a corresponding quantization parameter according to each piece of data to be quantized and a corresponding data bit width, wherein the computing the corresponding quantization parameter according to each piece of data to be quantized and the corresponding data bit width includes:
   when the quantization parameter does not include an offset of each piece of data to be quantized, obtaining a first type of point position of each piece of data to be quantized according to a maximum of an absolute value of each piece of data to be quantized and the corresponding data bit width; or
   when the quantization parameter does not include an offset of each piece of data to be quantized, obtaining a maximum of the piece of quantized data according to each piece of data to be quantized and the corresponding data bit width, obtaining a first type of scaling factor of each piece of data to be quantized according to the maximum of the absolute value of each piece of data to be quantized and the maximum of the piece of quantized data; or
   when the quantization parameter includes an offset of each piece of data to be quantized, obtaining a second type of point position of each piece of data to be quantized according to a maximum and a minimum of each piece of data to be quantized and the corresponding data bit width; or
   when the quantization parameter includes an offset of each piece of data to be quantized, obtaining the maximum of the piece of quantized data according to each piece of data to be quantized and the corresponding data bit width, and obtaining a second type of scaling factor of each piece of data to be quantized according to the maximum and the minimum of each piece of data to be quantized, and the maximum of the piece of quantized data.

6. The neural network quantization method of claim 1, further comprising:
   updating the data bit width corresponding to each piece of data to be quantized to a corresponding adjusted bit width, and computing a corresponding adjusted quantization parameter according to each piece of data to be quantized and the corresponding adjusted bit width to quantize each piece of data to be quantized according to the corresponding adjusted quantization parameter.

7. The neural network quantization method of claim 6, wherein the adjusting the data bit width of each piece of data to be quantized to obtain an adjusted bit width corresponding to each piece of data to be quantized according to the quantization error and an error threshold corresponding to each piece of data to be quantized includes when the quantization error is greater than a first error threshold, increasing the corresponding data bit width to obtain the corresponding adjusted bit width; and further comprising:
computing an adjusted quantization error of each piece of data to be quantized according to the piece of data to be quantized and the corresponding adjusted bit width;
continuing to increase the corresponding adjusted bit width according to the adjusted quantization error and the first error threshold until the adjusted quantization error is less than or equal to the first error threshold;
computing the adjusted quantization error of the data to be quantized according to the adjusted bit width and the piece of data to be quantized; and
continuing to decrease the corresponding adjusted bit width according to the adjusted quantization error and the second error threshold until the adjusted quantization error obtained according to the adjusted bit width and the piece of data to be quantized is greater than or equal to the second error threshold
wherein the adjusting the data bit width of each piece of data to be quantized to obtain an adjusted bit width corresponding to each piece of data to be quantized according to the quantization error and an error threshold corresponding to each piece of data to be quantized includes when the quantization error is less than a second error threshold, increasing the corresponding data bit width to obtain the corresponding adjusted bit width, where the second error threshold is less than the first error threshold.

8. The neural network quantization method of claim 1, wherein, during a fine-tuning stage and/or training stage of a neural network operation, the method further comprises:
obtaining a variation range of the data to be quantized in a current iteration and historical iterations, where the historical iterations are iterations before the current iteration; and
according to the variation range of the data to be quantized, determining a target iteration interval corresponding to the data to be quantized to enable the layer to be quantized to update the quantization parameter of the data to be quantized according to the target iteration interval, where the target iteration interval includes at least one iteration.

9. The neural network quantization method of claim 8, further comprising:
according to the data bit width of the data to be quantized in the current iteration, determining the data bit width of the data to be quantized in the iterations within the target iteration interval to enable the neural network to determine the quantization parameter; and
according to a point position of the data to be quantized in the current iteration, determining the point position of the data to be quantized in the iterations within the target iteration interval, where the point position includes the first type of point position and/or the second type of point position.

10. A neural network quantization device comprising one or more processing circuits, wherein for any layer to be quantized in a neural network, the device comprises:
a data determination module implemented on the one or more processing circuits and configured to determine a plurality of pieces of data to be quantized in target data of a layer to be quantized, wherein each piece of data to be quantized is a subset of the target data, the target data is any kind of data to be operated and quantized in the layer to be quantized, and the data to be operated includes at least one of an input neuron, a weight, a bias, and a gradient, and wherein a quantity of the plurality of pieces of data depends on one or more dimensions of the target data and the quantity of the plurality of pieces of data is inversely correlated to a processing capability of a device implementing the neural network quantization;
a data quantization module implemented on the one or more processing circuits and configured to determine, for each piece of data, a corresponding quantizing parameter based on a pre-determined correspondence, wherein the corresponding quantization parameter comprises one or more of the following: a decimal point position, a scaling factor, or an offset, and quantize each piece of data to be quantized according to the corresponding quantization parameter to obtain a piece of quantized data corresponding to each piece of data to be quantized, wherein the plurality of pieces of data are quantized in parallel;
a data operation module implemented on the one or more processing circuits and configured to obtain a quantization result of the target data according to the piece of quantized data corresponding to each piece of data to be quantized, so that an operation may be performed in the layer to be quantized according to the quantization result of the target data;
a first quantization error determination module implemented on one or more processing circuits and configured to determine a quantization error corresponding to the target data by
determining a difference between the plurality of pieces of data to be quantized and a plurality of pieces of de-quantized data of the plurality of quantized data; or
determining a difference as a total quantization interval over the plurality of pieces of data to be quantized;
wherein the quantization error is an average of the differences over a sum of the plurality of pieces of data to be quantized; and
an adjusted bit width determination module implemented on one or more processing circuits and configured to, according to the quantization error and an error threshold determined based on an empirical value, adjust a data bit width of each piece of data to be quantized to obtain an adjusted bit width corresponding to each piece of data to be quantized.

11. The neural network quantization device of claim 10, wherein the layer to be quantized is a convolution layer, the target data is an input neuron, and the data determination module includes:
a first determination sub-module configured to, in the input neuron of the convolution layer, determine a plurality of pieces of data to be quantized corresponding to a convolution kernel according to a dimension and stride of the convolution kernel, where the dimension of the convolution kernel includes height, width, and a count of channels.

12. The neural network quantization device of claim 10, wherein the data determination module includes:
a second determination sub-module configured to determine a plurality of pieces of data to be quantized in the target data of the layer to be quantized according to the dimension of the target data, where the dimension of the target data includes a count of batches, channel, height, and width,
wherein the second determination sub-module includes a determination sub-module based on a count of batches or channel configured to determine one or more batches of data in the target data of the layer to be quantized as one piece of data to be quantized.

13. The neural network quantization device of claim 10, wherein the data determination module includes:
a third determination sub-module configured to, according to a real-time processing capability of a device running the neural network, determine a plurality of pieces of data to be quantized in the target data of the layer to be quantized, where a size of each piece of data to be quantized is positively correlated with the real-time processing capability.

14. The neural network quantization device of claim 10, further comprising:
a parameter determination sub-module configured to compute the corresponding quantization parameter according to each piece of data to be quantized and a corresponding data bit width;
wherein the parameter determination sub-module includes:
a first point position determination sub-module configured to, when the quantization parameter does not include an offset of each piece of data to be quantized, obtain a first type of point position of each piece of data to be quantized according to a maximum of an absolute value of each piece of data to be quantized and the corresponding data bit width;
a first maximum determination sub-module configured to, when the quantization parameter does not include the offset of each piece of data to be quantized, obtain a maximum of the piece of quantized data according to each piece of data to be quantized and the corresponding data bit width;
a first scaling factor determination sub-module configured to obtain a first type of scaling factor of each piece of data to be quantized according to the maximum of the absolute value of each piece of data to be quantized and the maximum of the piece of quantized data;
a second point position determination sub-module configured to, when the quantization parameter includes the offset of each piece of data to be quantized, obtain a second type of point position of each piece of data to be quantized according to the maximum and a minimum of each piece of data to be quantized and the corresponding data bit width;
a second maximum determination sub-module configured to, when the quantization parameter includes the offset of each piece of data to be quantized, obtain the maximum of the piece of quantized data according to each piece of data to be quantized and the corresponding data bit width; and
a second scaling factor determination sub-module configured to obtain a second type of scaling factor of each piece of data to be quantized according to the maximum and the minimum of each piece of data to be quantized, and the maximum of the piece of quantized data.

15. The neural network quantization device of 10, further comprising:
an adjusted quantization parameter determination module configured to update the data bit width corresponding to each piece of data to be quantized to a corresponding adjusted bit width, and compute a corresponding adjusted quantization parameter according to each piece of data to be quantized and the corresponding adjusted bit width to quantize each piece of data to be quantized according to the corresponding adjusted quantization parameter;
a first adjusted quantization error module configured to compute an adjusted quantization error of each piece of data to be quantized according to the data to be quantized and the corresponding adjusted bit width; and
a first adjusting bit width cycle determination module configured to continue to increase the corresponding adjusted bit width according to the adjusted quantization error and the first error threshold until the adjusted quantization error is less than or equal to the first error threshold;
wherein the adjusted bit width determination module includes:
a first adjusted bit width determination sub-module configured to, when the quantization error is greater than a first error threshold, increase the corresponding data bit width to obtain the corresponding adjusted bit width; and
a second adjusted bit width determination sub-module configured to, when the quantization error is less than a second error threshold, decrease the corresponding data bit width to obtain the corresponding adjusted bit width, where the second error threshold is less than the first error threshold.

16. The neural network quantization device of claim 10, wherein, during a fine-tuning stage and/or training stage of a neural network operation, the device further includes:
a first data variation range determination module configured to obtain a variation range of the data to be quantized in a current iteration and historical iterations, where the historical iterations are iterations before the current iteration; and
a target iteration interval determination module configured to, according to the variation range of the data to be quantized, determine a target iteration interval corresponding to the data to be quantized to enable the layer to be quantized to update the quantization parameter of the data to be quantized according to the target iteration interval, where the target iteration interval includes at least one iteration.

17. The neural network quantization device of claim 16, further comprising:
a first target iteration interval application module configured to, according to the data bit width of the data to be quantized in the current iteration, determine the data bit width of the data to be quantized in the iterations within the target iteration interval to enable the neural network to determine the quantization parameter according to the data bit width of the data to be quantized in the iterations within the target iteration interval; and
a second target iteration interval application module configured to, according to a point position of the data to be quantized in the current iteration, determine the point position of the data to be quantized in the iterations within the target iteration interval, where the point position includes the first type of point position and/or the second type of point position.

18. An artificial intelligence chip, comprising the neural network quantization device of claim 10.

19. A non-transitory computer readable storage medium, on which a computer program instruction is stored, wherein when the computer program instruction is executed by a processor, the neural network quantization method of claim 1 is realized.

\* \* \* \* \*